United States Patent
Embry et al.

(10) Patent No.: US 12,347,575 B2
(45) Date of Patent: Jul. 1, 2025

(54) SYSTEMS AND METHODS FOR LASER INSPECTION AND MEASUREMENTS

(71) Applicant: 3D at Depth, Inc., Longmont, CO (US)

(72) Inventors: Carl W. Embry, Boulder, CO (US); Feldon M. Barlow, Sr., Richmond, TX (US); Jonathan M. Banks, Longmont, CO (US); Yann Morel, Edinburgh (GB)

(73) Assignee: 3D at Depth, Inc., Longmont, CO (US)

( * ) Notice: Subject to any disclaimer, the term of this patent is extended or adjusted under 35 U.S.C. 154(b) by 54 days.

(21) Appl. No.: 17/486,566

(22) Filed: Sep. 27, 2021

(65) Prior Publication Data

US 2022/0102018 A1    Mar. 31, 2022

Related U.S. Application Data

(60) Provisional application No. 63/083,299, filed on Sep. 25, 2020.

(51) Int. Cl.
*G21C 17/01* (2006.01)
*G01S 17/88* (2006.01)
(Continued)

(52) U.S. Cl.
CPC ............. *G21C 17/01* (2013.01); *G01S 17/88* (2013.01); *G21C 17/06* (2013.01); *G21C 19/207* (2013.01)

(58) Field of Classification Search
CPC ........ G21C 17/01; G21C 17/06; G21C 17/00; G21C 17/003; G21C 17/013; G21C 17/08; G21C 19/00; G21C 19/20; G21C 19/207
See application file for complete search history.

(56) References Cited

U.S. PATENT DOCUMENTS

| | | | |
|---|---|---|---|
| 4,123,160 A | | 10/1978 | Caputo et al. |
| 4,643,867 A | * | 2/1987 | Hornak ................. G21C 17/08 |
| | | | 976/DIG. 235 |

(Continued)

FOREIGN PATENT DOCUMENTS

| | | |
|---|---|---|
| AU | 2018300057 | 2/2020 |
| BR | 11-2020-000375 | 7/2020 |

(Continued)

OTHER PUBLICATIONS

Koch, R., Sedlazeck, A. (2012). Perspective and Non-perspective Camera Models in Underwater Imaging—Overview and Error Analysis. In: Dellaert, F., et al. (eds) Outdoor and Large-Scale Real-World Scene Analysis. Lecture Notes in Computer Science, vol. 7 (Year: 2012).*

(Continued)

*Primary Examiner* — Sharon M Davis
(74) *Attorney, Agent, or Firm* — Sheridan Ross P.C.

(57) ABSTRACT

Described herein are methods and systems for improved inspection, measurements, monitoring, and tracking of equipment installed underwater. They include structures or equipment installed in a nuclear reactor and fuel storage pools. This includes, but is not limited to an entire nuclear reactor pool, an entire nuclear reactor, fuel assemblies, fuel assembly identification numbers, core barrels, core plates, lower internals, upper internals, fuel transfer systems, alignment pins, baffle walls, former baffle assemblies, vessels, instrument ports, coolant tubes, spent fuel pools, dry cask storage areas, weir gates, steam dryers, steam separators, top guides, jet pumps, inside and outside of pipes, and weld seams. The described methods and devices increase the performance and integrity of the inspection and measurements during nuclear refuel, inspection or outage activities. The described methods and devices utilize one or more non-touch underwater optical system (including laser sys- (Continued)

tems) for underwater equipment inspection, measurements, maintenance, monitoring, tracking and servicing.

24 Claims, 17 Drawing Sheets

(51) Int. Cl.
  *G21C 17/06* (2006.01)
  *G21C 19/20* (2006.01)

(56) References Cited

U.S. PATENT DOCUMENTS

| | | | |
|---|---|---|---|
| 4,759,897 A * | 7/1988 | Tolino | G21C 17/06 |
| | | | 976/DIG. 231 |
| 5,026,999 A | 6/1991 | Leonard | |
| 5,152,957 A * | 10/1992 | Terai | G21C 19/26 |
| | | | 376/310 |
| 5,311,272 A | 5/1994 | Daniels et al. | |
| 5,343,284 A | 8/1994 | Keeler et al. | |
| 5,384,589 A | 1/1995 | Ulich et al. | |
| 5,809,099 A | 9/1998 | Kim et al. | |
| 5,912,934 A * | 6/1999 | Acks | G21C 17/08 |
| | | | 376/249 |
| 6,672,131 B1 | 1/2004 | Aldal et al. | |
| 6,836,285 B1 | 12/2004 | Ubard et al. | |
| 7,139,647 B2 | 11/2006 | Larsen | |
| 7,683,928 B2 | 3/2010 | Lubard et al. | |
| 7,688,348 B2 | 3/2010 | Lubard et al. | |
| 8,184,276 B2 | 5/2012 | Embry | |
| 8,380,375 B2 | 2/2013 | Tink | |
| 8,467,044 B2 | 6/2013 | Embry | |
| 8,781,790 B2 | 7/2014 | Zhu et al. | |
| 8,891,069 B2 | 11/2014 | Pedersen et al. | |
| 8,903,576 B2 | 12/2014 | Tink | |
| 8,929,176 B2 | 1/2015 | Debrunner et al. | |
| 8,960,008 B1 | 2/2015 | Blackmon et al. | |
| 9,223,025 B2 | 12/2015 | Debrunner et al. | |
| 9,229,108 B2 | 1/2016 | Debrunner et al. | |
| 9,234,618 B1 | 1/2016 | Zhu et al. | |
| 9,330,633 B2 | 5/2016 | Sakai et al. | |
| 9,348,026 B2 | 5/2016 | Armbruster et al. | |
| 9,511,831 B2 | 12/2016 | Kimura et al. | |
| 9,568,590 B1 | 2/2017 | Haupt et al. | |
| 9,776,695 B2 | 10/2017 | Kimura et al. | |
| 9,791,555 B2 | 10/2017 | Zhu | |
| 9,846,232 B1 | 12/2017 | Thompson et al. | |
| 10,018,726 B2 | 7/2018 | Hall et al. | |
| 10,116,841 B2 | 10/2018 | Boyle et al. | |
| 10,116,842 B2 | 10/2018 | Boyle et al. | |
| 10,158,793 B2 | 12/2018 | Boyle et al. | |
| 10,163,213 B2 | 12/2018 | Boyle et al. | |
| 10,183,732 B2 | 1/2019 | Celikkol et al. | |
| 10,321,810 B2 | 6/2019 | Ikuta et al. | |
| 10,450,041 B2 | 10/2019 | Kimura et al. | |
| 10,502,829 B2 | 12/2019 | Embry et al. | |
| 10,545,233 B1 | 1/2020 | Embry et al. | |
| 10,571,567 B2 | 2/2020 | Campbell et al. | |
| 10,571,687 B2 | 2/2020 | Johnson | |
| 10,627,516 B2 | 4/2020 | Eichenholz | |
| 10,698,112 B2 | 6/2020 | Embry et al. | |
| 10,714,889 B2 | 7/2020 | Hong et al. | |
| 10,838,042 B2 | 11/2020 | Badoni et al. | |
| 10,845,482 B2 | 11/2020 | Frederiksen et al. | |
| 10,871,567 B2 | 12/2020 | Embry et al. | |
| 11,125,875 B2 | 9/2021 | Embry et al. | |
| 2002/0038187 A1 | 3/2002 | Maness et al. | |
| 2002/0170792 A1 | 11/2002 | Phelan et al. | |
| 2003/0079774 A1 | 5/2003 | Reyman | |
| 2004/0093174 A1 | 5/2004 | Lander | |
| 2004/0261547 A1 | 12/2004 | Russell et al. | |
| 2005/0060105 A1 | 3/2005 | Lander | |
| 2005/0279169 A1 | 12/2005 | Lander | |
| 2006/0221349 A1 | 10/2006 | Que et al. | |
| 2006/0233485 A1 | 10/2006 | Allen | |
| 2007/0095153 A1 | 5/2007 | Rieder et al. | |
| 2007/0130317 A1 | 6/2007 | Lander | |
| 2007/0199383 A1 | 8/2007 | Lander et al. | |
| 2007/0242134 A1 | 10/2007 | Zernov | |
| 2008/0300742 A1 | 12/2008 | Weaver et al. | |
| 2009/0141591 A1 | 6/2009 | Basilico | |
| 2009/0225925 A1 | 9/2009 | Eisner et al. | |
| 2009/0287414 A1 | 11/2009 | Vickery | |
| 2010/0037707 A1 | 2/2010 | Bitto et al. | |
| 2010/0089161 A1 | 4/2010 | Taheri | |
| 2010/0324839 A1 | 12/2010 | Martin | |
| 2011/0088910 A1 | 4/2011 | McCann et al. | |
| 2011/0116074 A1 | 5/2011 | Valla et al. | |
| 2011/0144930 A1 | 6/2011 | Bruno et al. | |
| 2011/0197681 A1 | 8/2011 | Rieder et al. | |
| 2012/0007743 A1 | 1/2012 | Solomon | |
| 2012/0022822 A1 | 1/2012 | Rousselle | |
| 2012/0062963 A1 | 3/2012 | Gillham et al. | |
| 2012/0099395 A1 | 4/2012 | Debrunner et al. | |
| 2012/0124850 A1 | 5/2012 | Ortleb et al. | |
| 2012/0213320 A1 | 8/2012 | Lange et al. | |
| 2012/0266803 A1 | 10/2012 | Zediker et al. | |
| 2013/0030577 A1 | 1/2013 | Jarrell et al. | |
| 2013/0061688 A1 | 3/2013 | Hayward | |
| 2013/0206967 A1 | 8/2013 | Shpunt | |
| 2013/0215012 A1 | 8/2013 | Reddy et al. | |
| 2014/0022530 A1 | 1/2014 | Farhadiroushan et al. | |
| 2014/0054429 A1 | 2/2014 | Conzen et al. | |
| 2014/0078409 A1 | 3/2014 | Wang et al. | |
| 2014/0174186 A1 | 6/2014 | Salomon | |
| 2014/0268107 A1 | 9/2014 | Kremeyer | |
| 2014/0283585 A1 | 9/2014 | Sæther | |
| 2014/0320629 A1 | 10/2014 | Chizeck et al. | |
| 2014/0328141 A1 | 11/2014 | Rikoski et al. | |
| 2015/0078123 A1 | 3/2015 | Batcheller et al. | |
| 2015/0116692 A1 | 4/2015 | Zuk et al. | |
| 2015/0153743 A1 | 6/2015 | Jarrell et al. | |
| 2015/0363914 A1 | 12/2015 | Boyle et al. | |
| 2016/0012925 A1 * | 1/2016 | Ahlberg | G21D 3/001 |
| | | | 376/258 |
| 2016/0198069 A1 | 7/2016 | Boyle et al. | |
| 2016/0198074 A1 | 7/2016 | Boyle et al. | |
| 2016/0306040 A1 | 10/2016 | Hunt et al. | |
| 2016/0320526 A1 | 11/2016 | Chen et al. | |
| 2017/0089829 A1 | 3/2017 | Bartholomew | |
| 2017/0328751 A1 | 11/2017 | Lemke | |
| 2017/0328982 A1 | 11/2017 | Jongsma et al. | |
| 2018/0194446 A1 | 7/2018 | Fruhling et al. | |
| 2018/0284274 A1 | 10/2018 | LaChapelle | |
| 2018/0321385 A1 | 11/2018 | Embry et al. | |
| 2019/0019266 A1 | 1/2019 | Boyle et al. | |
| 2019/0031308 A1 | 1/2019 | Daley et al. | |
| 2019/0084658 A1 | 3/2019 | Bonel et al. | |
| 2019/0234808 A1 | 8/2019 | Speck et al. | |
| 2020/0126681 A1 * | 4/2020 | Mann | G21C 19/207 |
| 2020/0164788 A1 | 5/2020 | Roth et al. | |
| 2021/0141085 A1 | 5/2021 | Embry et al. | |
| 2022/0146644 A1 | 5/2022 | Butler et al. | |

FOREIGN PATENT DOCUMENTS

| | | | |
|---|---|---|---|
| BR | 11-2020-000387 | 7/2020 | |
| CA | 3069305 | 1/2019 | |
| CA | 3069309 | 1/2019 | |
| CN | 105716591 | 6/2016 | |
| CN | 106199991 | 12/2016 | |
| CN | 110441792 | 11/2019 | |
| CN | 210487977 | 5/2020 | |
| EP | 1321777 | 6/2003 | |
| EP | 2866051 | 4/2015 | |
| EP | 3524949 | 8/2019 | |
| EP | 3652474 | 5/2020 | |
| EP | 3652929 | 5/2020 | |
| FR | 2569896 A1 * | 3/1986 | C21C 17/08 |
| JP | 2017-187442 | 10/2017 | |
| KR | 101426474 | 8/2014 | |
| WO | WO 99/29463 | 6/1999 | |
| WO | WO 2011/161513 | 12/2011 | |
| WO | WO 2014/013244 | 1/2014 | |

(56) References Cited

FOREIGN PATENT DOCUMENTS

| WO | WO 2015/011270 | 1/2015 |
|---|---|---|
| WO | WO 2016/068715 | 5/2016 |
| WO | WO 2016/142576 | 9/2016 |
| WO | WO 2019/014245 | 1/2019 |
| WO | WO 2019/014253 | 1/2019 |
| WO | WO 2020/076336 | 4/2020 |
| WO | WO 2021/143665 | 7/2021 |

OTHER PUBLICATIONS

International Search Report and Written Opinion for International (PCT) Patent Application No. PCT/US2021/052224, dated May 27, 2022, 20 pages.

U.S. Appl. No. 17/408,948, filed Aug. 23, 2021, Embry et al.

Subsea Acceleration and Vibration Logger, Omni Instruments, 2009, 4 pages [retrieved online from: www.omniinstruments.co.uk/subsea-acceleration-and-vibration-logger.html].

"Subsea Leak Detection—an Overview," Neptune Oceanographics Limited, 2015, 5 pages [retrieved online from: www.neptuneoceanographics.com/documents/LeakReport2015.pdf].

"Subsea Piping Vibration for new and existing systems," Wood, 2018, 3 pages [retrieved online from: www.betamachinery.com/services/subsea-piping-vibration].

"Ultrasonic Intelligent Sensors ClampOn Subsea 3D Vibration Monitor Digital Signal Processing," ClampOn AS, May 2016, 2 pages.

Artlett et al., "Optical remote sensing of water temperature using Raman spectroscopy," Optics Express, vol. 23, No. 25, Dec. 14, 2015, 13 pages.

Coimbra et al. "Chevron fined $28 million, faces Brazil spill backlash," Reuters, Nov. 21, 2011, 12 pages [retrieved online from: www.reuters.com/article/us-chevron-brazil/chevron-fined-28-million-faces-brazil-spill-backlash-idUSTRE7AG15S20111122].

Embry, "High Resolution 3D Laser Imaging for Inspection, Maintenance, Repair, and Operations," RPSEA Phase 1 Final Report, Mar. 9, 2012, 48 pages.

Hariharan et al. "Drilling Riser Management In Deepwater Environments," Pulse Structural Monitoring, Feb. 2007, 9 pages [retrieved online from: www.pulse-monitoring.com/assets/uploads/cms/files/118-64.pdf].

Ishida et al., "Marker based camera pose estimation for underwater robots," 2012 IEEE/SICE International Symposium on System Integration, Kyushu University, Fukuoka, Japan, Dec. 16-18, 2012, 6 pages.

Isomäki et al., "Monitoring of the Submerged Structures of Dams," VRT Finland, 84th ICOLD Annual Meeting, May 20, 2016, 8 pages.

Kim et al., "LAROB: Laser-Guided Underwater Mobile Robot for Reactor Vessel Inspection," IEEE/ASME Transactions on Mechatronics, vol. 19, No. 4, Aug. 2014, pp. 1216-1225.

Leonard et al., "Experimental remote sensing of subsurface temperature in natural ocean water," Geophysical Research Letters, vol. 4, No. 7, Jul. 1977, pp. 279-281. Abstract only.

Lim et al. "Deepwater Riser VIV, Fatigue and Monitoring," Presented at Deepwater Pipeline & riser Technology Conference, Houston, Mar. 6-9, 2000, 12 pages [retrieved online from: www.puls-monitoring.com/assets/uploads/cms/files/135-64.pdf].

McKeever et al., "The Thermographic Phosphor Labkit," 2015 BFY Proceedings, American Association of Physics Teachers, Nov. 2015, pp. 68-71.

Nilson "Ultrasonic Intelligent Sensors Advanced LPHP Subsea 3D Vibration Monitor," ClampOn AS, Jun. 2016, Revision 3, 2 pages.

Nilson "Ultrasonic Intelligent Sensors Standalone LPHP Subsea Vibration Monitor," ClampOn AS, Jun. 2016, Revision 4, 2 pages.

Otto et al., "Thermo-Chromium: A Contactless Optical Molecular Thermometer," Chemistry, vol. 23, 2017, pp. 12131-12135.

Paschoa "Understanding Subsea Acoustic Leak Detection and Condition Monitoring—Part 2," Marine Technology News, Oct. 7, 2014, 7 pages [retrieved online from: https://www.marinetechnologynews.com/blogs/understanding-subsea-accoustic-leak-detection-and-condition-omonitoring-e28093-part-2-700516].

Park et al., "Visualization using 3D voxelization of full lidar waveforms," Institute of Electrical and Electronics Engineers, Proceedings of SPIE, vol. 9262, Nov. 17, 2014, 10 pages.

Prats et al. "Template Tracking and Visual Servoing for Alignment Tasks with Autonomous Underwater Vehicles," The International Federation of Automatic Control, Sep. 19-21, 2012, 9th IFAC Conference on Manoeuvring and Control of Marine Craft, 2012, Arenzano, Italy, 6 pages.

Schorstein et al., "Depth-resolved temperature measurements of water using the Brillouin lidar technique," Applied Physics B, vol. 97, No. 931, Jul. 24, 2009, pp. 931-934. Abstract only.

Skalle et al. "Wells and Well Intervention, Evaluation of deepwater kicks and future countermeasures," Norwegian University of Science and Technology, Mar. 2012, 15 pages [retrieved online from: www.ipt.ntnu.no/~pskalle/files/TechnicalPapers/23_deepwaterkick.pdf].

Invitation to Pay Additional Fees for International (PCT) Patent Application No. PCT/US2021/052224, dated Mar. 15, 2022, 9 pages.

International Preliminary Report on Patentability for International (PCT) Patent Application No. PCT/US2021/052224, dated Apr. 6, 2023, 13 pages.

"Infrared Thermometers," Williamson, 2008, 11 pages.

Behroozpour et al., "Lidar System Architectures and Circuits," IEEE Communications Magazine, Oct. 2017, pp. 135-142.

Mai et al., "Subsea Infrastructure Inspection: A Review Study," 6th International Conference on Underwater System Technology: Theory and Applications, Dec. 2016, 7 pages.

Jacobson et al. "AUV-based 3D laser imaging," Offshore Engineer, Mar. 27, 2014, 5 pages [retrieved online from: www.oedigital.com/news/456412-auv-based-3d-laser-imaging].

Moltisanti et al. "Monitoring Accropodes Breakwaters using RGB-D Cameras," Proceedings of the 10th International Conference on Computer Vision Theory and Applications (VISAPP-2015), 2015, pp. 76-83.

\* cited by examiner

SYSTEMS AND METHODS FOR LASER INSPECTION AND MEASUREMENTS

CROSS-REFERENCE TO RELATED APPLICATIONS

This application claims the benefit of U.S. Provisional Patent Application Ser. No. 63/083,299, filed Sep. 25, 2020, the entire disclosure of which is hereby incorporated herein by reference.

FIELD

The present disclosure is directed to methods and systems for remote, contactless measurements and inspections. Embodiments of the present disclosure can be applied to, for example, performing inspections and measurements of equipment in nuclear reactor pools.

BACKGROUND

The measurement and inspection of equipment within a nuclear reactor pool is important to ensuring the safe, efficient, and reliable operation of such equipment. Through radiation, environmental and/or operational conditions, such underwater equipment can experience undesirable damage or deterioration. In addition, during standard refueling operations critical items such as fuel assemblies are moved and then placed back in the primary core vessel. The fuel assemblies are therefore now in a new location whose exact location is not known. If the spacing between the fuel assemblies is not correct, they can be damaged when the upper internals are mounted over the core, causing the radioactive fuel to leak into the reactor water.

There is an immense amount of maintenance that takes place in and around the vessel while the cavity is dry or full of water during refueling activities. During these maintenance activities, the risk of foreign material making its way into the reactor vessel becomes very high. Foreign material can be as small as a bristle from a wire brush to a nut or bolt multiple inches in length. These foreign objects have been discovered on top of core plates, below core plates, in flow holes, lodged in reactor coolant pumps and even finding their way to the very bottom floor of the reactor vessel. Foreign material causes and has caused significant damage to fuel assemblies in the core. Damaged fuel assemblies from foreign material increases radiological dose rates resulting in an unnecessary and unplanned dose for personnel working in and around the reactor vessel. This unplanned dose increases health risks and increases operating costs for utilities significantly.

Conventional techniques for inspection and monitoring reactor vessel components usually involve underwater cameras. To achieve the desired resolution for inspections the cameras are normally just a few feet from the object being inspected. This has two limitations. First, the Field of View (FOV) is limited at short ranges to a small area (a few square feet at most), therefore the camera must be moved to inspect or measure an entire area (hundreds of square feet). Second, many times the camera is inspecting an object that is radioactive. The water in a nuclear reactor provides radiation shielding, the effectiveness of which increases with distance. Cameras and electronics that are only a few feet from a radiation source receive radiation damage that either reduces the life of the instrument or requires the instrument to be radiation hardened at extra cost. Accordingly, it is preferable to maintain a distance of more than a few feet between the cameras and electronics and radiation sources. In addition, the operation of the underwater cameras and the interpretation of the images displayed on the cameras is extremely subjective in many instances. This variability in the operation of the camera and the interpretation of the images has led to many nuclear industry mishaps.

Underwater camera inspections produce video data that is required to be stored. This video data will vary from a few minutes in length to tens of hours of video footage. Underwater camera inspection data has a need to be reviewed and retained for several years in many scenarios. Sorting through hours and hours of conventional underwater camera video can be labor intensive and creates error-likely situations.

In addition, sometimes measurements are required which cannot be performed by cameras. In these instances, special tooling, gauges and unique engineered mechanical devices are deployed on poles to reach the measurement location up to 60 feet underwater. This is obviously time consuming and requires a human operator to be standing over the reactor pool. Another option is to bring the object out of the water. Often the object is highly radioactive, so this becomes a health hazard when the object is not in water to provide shielding.

Accordingly, it would be desirable to provide systems and methods that allowed for the non-contact, remote measurement and inspection of equipment within the reactor pool, without requiring direct contact with the equipment or the removal of the equipment from the water. An accurate, long distance underwater measurement method is desired.

SUMMARY

The present disclosure provides systems and methods for the measurement and inspection of any and all structures or equipment installed underwater. In particular, systems and methods are provided for measuring and inspecting structures or equipment installed in a nuclear reactor and support building. This includes, but is not limited to, an entire nuclear reactor pool, an entire nuclear reactor, fuel assemblies, fuel assembly identification numbers, core barrels, core plates, lower internals, upper internals, fuel transfer systems, alignment pins, baffle walls, former baffle assemblies, vessels, instrument ports, coolant tubes/nozzles, spent fuel pools, dry cask storage areas, weir gates, steam dryers, steam separators, top guides, jet pumps, inside and outside of pipes, and weld seams. The described methods and devices increase the performance and integrity of the inspection and measurements during nuclear refueling, inspection or outage activities. The described methods and devices utilize one or more non-touch underwater optical systems (including laser systems) for nuclear reactor inspections, measurements, maintenance, and servicing. Monitoring of underwater systems can include inspection, measurements, monitoring shifts in location over time, vibrations, flow rates, temperature, material wear, degradation and/or leaks. This includes but is not limited to vibrations caused by operating or environmental conditions, fluid leaks, and other dynamic conditions related to the equipment.

Systems in accordance with embodiments of the present disclosure can include various optical sensors provided as part of passive or active, light-based metrology systems or sensors.

In accordance with at least some embodiments of the present disclosure, a monitoring and inspection system is provided that includes a light detection and ranging (hereinafter "lidar") device or system. In such embodiments, the lidar device can be in the form of a scanning lidar, flash lidar, flash time of flight (ToF) lidar, pulsed laser lidar, amplitude modulated continuous wave (AMCW) phase detection lidar, chirped AMCW lidar, amplitude frequency modulated continuous wave (FMCW) lidar, true FMCW lidar, pulse modulation code, or other lidar system. Moreover, the lidar system can incorporate a pulsed or modulated continuous wave laser light source. Other embodiments can include an inspection system incorporating a laser triangulation, photometric stereo, stereoscopic vision, structured light, photoclinometry, stereo-photoclinometry, holographic, digital holographic, or other device that uses light to sense three-dimensional (3D) space. The lidar system is placed in the vicinity of the equipment to be monitored. In accordance with embodiments of the present disclosure, multiple pieces of equipment can be monitored by a single lidar system. In accordance with further embodiments of the present disclosure, multiple lidar systems are used in combination to monitor or inspect one or more pieces of underwater equipment. In accordance with still other embodiments of the present disclosure, targets, such as the well-known Leica targets, three-dimensional spherical targets, or other target indicia or structures can be attached to pieces of equipment and observed by one or more optical systems.

A monitoring and inspection system as disclosed herein can include a lidar system that operates to generate three-dimensional point cloud data of structures and components in accordance with embodiments of the present disclosure can include a topside enclosure or control box that is interconnected to a submersible optical head by an intermediate assembly. The topside enclosure can be configured for mounting to a rail of an operating platform in a nuclear reactor or support building. The intermediate assembly can include a structural member and a tether containing power and signal lines. The structural member can be interconnected to the rail by a support assembly. In accordance with various embodiments, the optical head is connected to the structural member by a pan and tilt head. The tether of the intermediate assembly extends between and operably connects the topside enclosure and the optical head. The topside enclosure can include at least a communication interface and a power supply. The optical head can include at least a window, transmit/receive optics, and a primary receiver. In addition, the monitoring and inspection system can include a light source disposed within the optical head, or disposed within the topside enclosure and connected to the transmit/receive optics in the optical head by an optical fiber included in the tether. Other components of the monitoring and inspection system can include a processor and memory. In accordance with at least some embodiments of the present disclosure, the monitoring system includes optically based temperature measuring sub-systems and associated beamsplitters and receivers.

Methods in accordance with embodiments of the present disclosure include disposing at least some components of a lidar system in a topside enclosure, disposing other components of the lidar system in a submersible optical head, and interconnecting the components in the topside enclosure to those in the optical head with components provided as part of an intermediate assembly. The methods further include connecting the topside enclosure and a structural member of the intermediate assembly to an operator bridge, and submerging the optical head underwater, so as to position a field of view of the lidar system to encompass areas to be inspected or measured. The position of the optical head, and the field of view of the lidar system can be altered by moving the structural member, and/or through operation of a pan and tilt head connecting the optical head to a submerged end of the structural member. The point cloud data obtained by the lidar system can be presented to an operator in real time. The point cloud data can also be stored for future reference. In addition to point cloud data of the actual locations of components or structures within a reactor, the monitoring and inspection system can obtain and record identification information of individual components, such as fuel assemblies. Moreover, the locations can be recorded relative to reference points, such as targets or structural features. In operation for vibration measurements, a monitoring and inspection system in accordance with embodiments of the present disclosure makes a rapid number of range, angle, angle, intensity measurements of a scene containing an underwater structure, thus producing a set of point cloud data. A particular location or locations on the underwater structure are then selected, and a rapid number of range, angle, angle, intensity measurements are made relative to a selected location in series. The timing of the range measurements is accurately recorded.

Using the range and time measurements, vibration displacement (direct measurement) and frequency content (through a Fourier Transform or other calculation) can be calculated. A single spot sensor (such as a scanning lidar) can be programed to measure multiple locations in a fast succession in order to obtain vibration distance and frequency information at multiple known locations on the underwater structure at virtually the same time. This can then be used to calculate the vibration mode of the underwater structure. As a further alternative, a laser line scan system, triangulation sensor, structured light sensor, holographic, or flash lidar could be used to make range, angle, angle measurement on multiple points simultaneously. As yet another alternative, scans can be taken from multiple optical or lidar devices simultaneously or in a time coordinated manner.

In operation for displacement or location measurements, a monitoring and inspection system as disclosed herein makes a rapid number of range, angle, angle, and intensity measurements of the monitored equipment or other underwater structure in relation to the monitoring and inspection system itself, other pieces of equipment, monuments, or other "known" points in space, thus producing a set of point cloud data comprising a 3-D scan of the underwater scene. Alternately, the monitoring system makes a rapid number of range, angle, angle, and intensity measurements of specific targets mounted on the monitored equipment in relation to specific targets mounted on other pieces of equipment, monuments, or other "known" points in space. Change or location detection is performed on the point cloud data, which may comprise time stamped X, Y, Z, intensity datasets, to determine if movement of the monitored underwater structure has occurred over a selected time span (which can vary from under a minute to over a year). A map of the nuclear reactor pool is known (through drawings, models, or previous scans) and the scanned objects or targets are compared to known global targets on the map to identify the location of the moving object within the reactor pool map. As opposed to a single spot lidar, multiple single spots can be scanned simultaneously. Alternately, a laser line scan system, triangulation sensor, structured light sensor, flash lidar, holographic, or other light-based metrology system could be used to make the range, angle, angle, and intensity measurements. As yet another alternative, scans can be taken from multiple optical or lidar devices simultaneously or in a time coordinated manner.

Additional features and advantages of embodiments of the present disclosure will become more readily apparent from the following description, particularly when taken together with the accompanying drawings.

DETAILED DESCRIPTION

Figure 1:
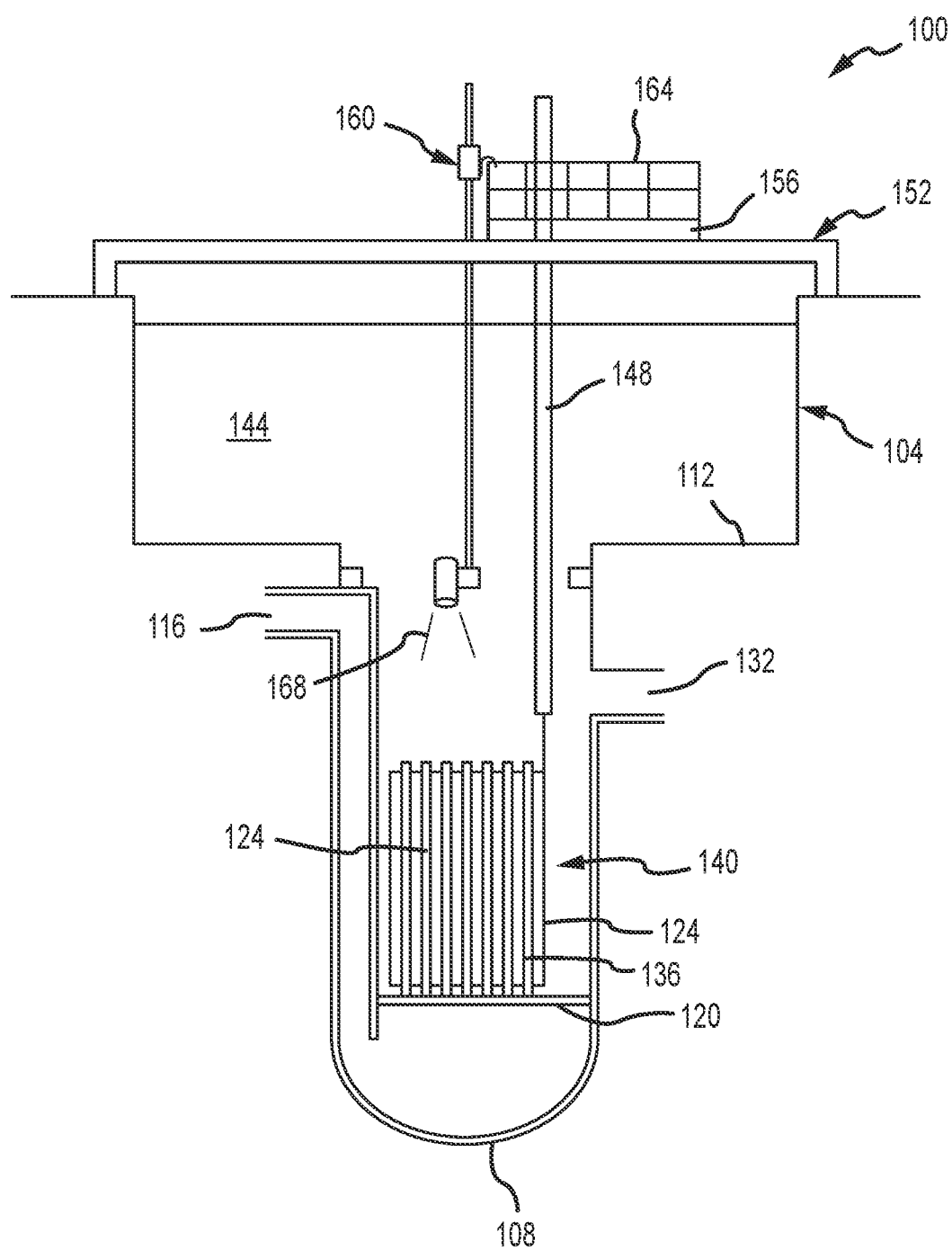
FIG. 1 depicts a view of the interior of an example nuclear reactor facility reactor building, with a monitoring and inspection system in accordance with embodiments of the present disclosure disposed therein.

FIG. 1 depicts components and structures that can be included within the reactor building 100 of a nuclear reactor facility, such as but not limited to a nuclear power plant. As shown, the reactor building or facility 100 can include a nuclear reactor pool or refueling cavity 104 and a reactor pressure vessel 108, disposed in a floor 112 of the pool 104. The facility 100 can further include a fuel storage pool. The reactor pressure vessel 108 includes an inlet 116, a lower core plate 120, fuel assemblies or fuel rods 124, and an outlet 132. In the configuration shown in FIG. 1, the reactor pressure vessel 108 has been opened for maintenance.

Figure 2:
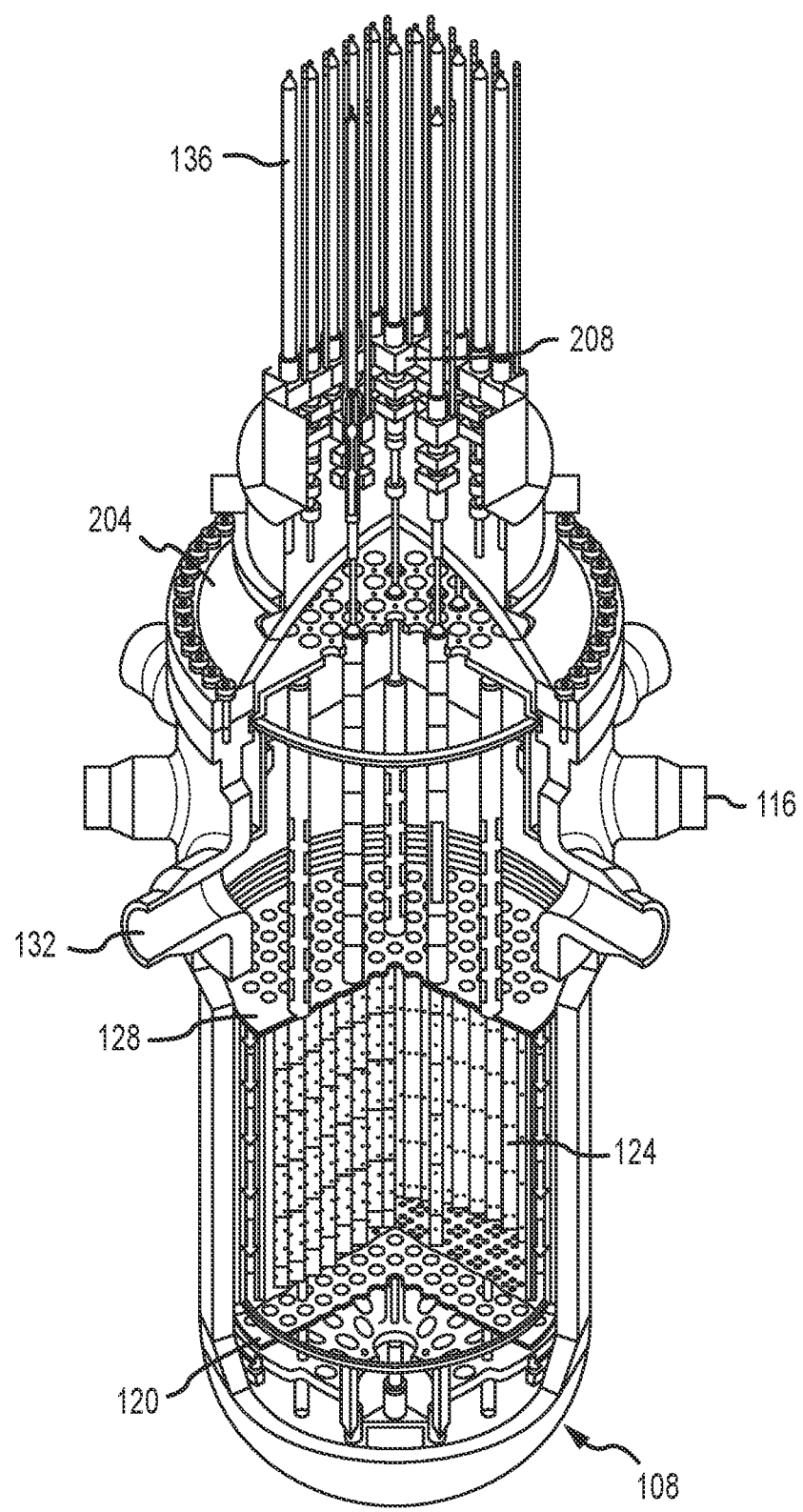
FIG. 2 depicts components of an example nuclear reactor vessel.

FIG. 2 depicts components of an example nuclear reactor 106. In particular, as shown in FIG. 2, when the reactor 106 is in an operational configuration, the reactor pressure vessel 108 is capped by a closure head assembly 204. The closure head assembly 204 can incorporate or accommodate a control rod drive mechanism 208, which allows the control rods 136 to be selectively inserted into or withdrawn from the fuel assembly area 140 of the reactor pressure vessel 108, where the fuel assemblies 124 are located.

With reference now to FIGS. 1 and 2, during normal maintenance or refueling operations, the closure head assembly 204 and the associated control rod drive mechanism 208 are removed. The refueling cavity 104 is filled with boronated water 144 prior to removing the closure head assembly, to absorb stray heat and radiation. During refueling, spent fuel assemblies 124 are removed from the reactor core 140 by a manipulator crane or mast 148. Fresh fuel assemblies 124 can then be placed in the reactor core 140 using the mast 148. In a typical implementation, a bridge assembly 152 carries the mast 148, and provides an operator platform 156. Moreover, the bridge assembly 152 can include tracks or rails that allow the operator platform 156 and the mast 148 to be moved relative to the reactor vessel 108. For example, by selectively positioning the bridge assembly 152 relative to the reactor pressure vessel 108, the mast 148 can in turn be positioned so that it can place a new fuel assembly 124 in a selected area on the lower core plate 120. As can be appreciated by one of skill in the art after consideration of the present disclosure, the precise placement of the fuel assemblies 124 or various other components within the reactor pressure vessel 108 is critical to the efficient operation of the reactor 106. However, direct verification of the proper placement of the various components within the reactor pressure vessel 108 has been extremely difficult and time-consuming. In particular, it has been difficult to take measurements from within the reactor core 140, particularly when the refueling cavity 104 is filled with water 144, as during refueling operations.

In accordance with embodiments of the present disclosure, a monitoring and inspection system 160, hereinafter referred to simply as an inspection system 160, is provided that enables inspection and measurement of components, including but not limited to fuel rod assemblies 124, within a reactor vessel 108. Moreover, embodiments of the present disclosure provide an inspection system 160 that can operate to inspect and measure locations of components in the reactor pool 104, even when those components are immersed in water. An inspection system 160 in accordance with embodiments of the present disclosure can be operated from an operator platform 156 of a bridge assembly 152 within a reactor building 100. For example, the inspection system 160 can be secured to a railing 164 of the operator platform 156. Moreover, the positioning of components of the inspection system 160 can be manipulated so that a field of view 168 of the inspection system 160 is directed towards and encompasses selected components or associated equipment or structures within the underwater environment.

Figure 3:
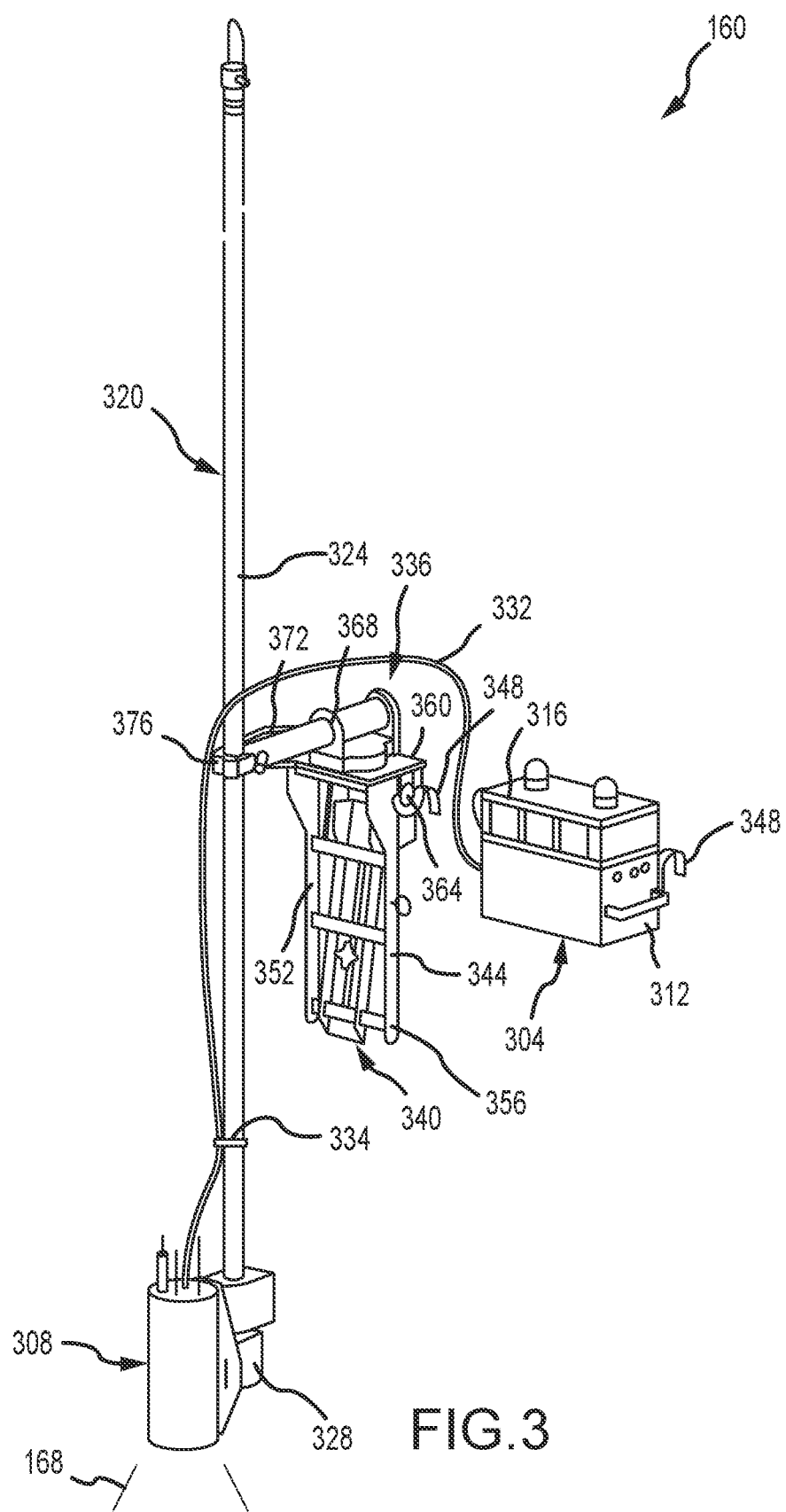
FIG. 3 depicts an example of a monitoring and inspection system in accordance with embodiments of the present disclosure.

FIG. 3 depicts a monitoring and inspection system 160 in accordance with an exemplary embodiment of the present disclosure. The inspection system 160 generally includes a topside enclosure or control box 304 and an underwater optical housing or head 308. The control box 304 can include a sealed chamber or enclosure 312 and a cooling unit 316. In accordance with embodiments of the present disclosure, the sealed enclosure 312 is sealed such that components disposed therein are not exposed to or in contact with the air in the surrounding environment. As discussed in greater detail elsewhere herein, various components of the inspection system 160, such as but not limited to a power supply and a communications interface, can be disposed within the control box 304 enclosure 312. The sealed enclosure 312 is thermally joined to the cooling unit 316 by a conductive plate or plates. The cooling unit 316 can be open to the surrounding environment, or it can also be sealed. By sealing the enclosure 312 and/or the cooling unit 316, contamination of the included components can be prevented. In another embodiment, cooling components can be placed inside the sealed enclosure 312 so that a separate cooling unit 316 is not required. This can be accomplished by placing cooling components (such as fans, thermoelectric coolers, heat pipes, and heat sinks (such as fins)) inside of the sealed enclosure 312. The cooling components can transfer heat to the outside of the sealed enclosure 312 through a thermal interface that includes heat sink fins disposed in the open environment, as opposed to inside a cooling unit 316. The control box 304 can be provided with clamps, hooks, or other fixing members 348 to mount the control box 304 to the railing 164 of the operator platform 156.

In accordance with embodiments of the present disclosure, at least some elements of an intermediate assembly 320 are connected to the optical housing 308. In particular, the intermediate assembly 320 can include one or more structural members 324, such as a tube, pole, telescopic pole, or rollable tube that is joined to the optical housing 308 by a pan and/or tilt head 328. The structural member 324 can have a fixed or adjustable length. Moreover the length of the structural member 324 is selected so as to place the optical head 308 at a location such that the field of view 168 of the inspection system 160 encompasses a desired area. As examples, the structural member 324 can be 4 m to 20 m in length. As a particular example, the structural member 324 is at least 7 m in length. The intermediate assembly 320 can also include a tether 332, made up of various signal and power lines, to operatively connect the control box 304 to the optical housing 308. The various signal lines can be at least partially housed within or attached to the one or more structural members 324 of the intermediate assembly 320. For example, the signal lines 332 can be enclosed within a rigid tube, a flexible sheath, or a combination of flexible and rigid sections included as part of the structural member or members 324, and/or can be connected to an exterior of the structural member 324 by one or more straps or ties 334.

The structural member 324 of the intermediate assembly 320 can be fixed to the topside enclosure 304. Alternatively or in addition, the structural member 324 can be connected to a support assembly or bracket 336. The support assembly 336 can include a mounting assembly 340 to interconnect the support assembly 336 to the railing 164 of the operator platform 156. As an example, the mounting assembly 340 can include a mounting arm 344 and a plurality of clamps or hooks 348. In addition, the support assembly 336 can include components that allow the structural member 324 and the connected optical housing 308 to be moved relative to the operator platform 156, facilitating the positioning of the optical head 308 relative to components within or around the reactor pressure vessel 108. For example, the support assembly 336 can include a pivot arm 352 having a first end that is connected to the mounting assembly 340 by a first pivot assembly 356, allowing the structural member 324 to be moved away from the railing 164. A table portion 360 is connected to a second end of the pivot arm 352 by a second pivot assembly 364. In the illustrated embodiment, a swivel assembly 368 is rotatably joined to the table portion 360. The swivel assembly 368 can include an arm 372 having a clamp 376 that secures the structural member 324 to the support assembly 336. In accordance with embodiments of the present disclosure, the arm 372 can be rotated within the swivel assembly 368, and the location at which the clamp 376 is secured to the structural member 324 can be selected, for example to place the optical housing 308 at a selected depth under the surface of the water 144.

The optical housing 308 can include a watertight, sealed pressure vessel that contains various optical and other components. In particular, the optical housing 308 is watertight, to allow the optical housing to be submerged. In addition, the optical housing 308 can provide radiation shielding. These features can facilitate deployment of the inspection system 160 in nuclear reactor buildings 100, and in particular in the inspection and measurement of components or structures submerged in reactor water 144, including but not limited to components in or associated with a nuclear reactor 106.

As noted, the topside enclosure or control box 304 can be connected to the optical head 308 by at least portions of an intermediate member 320. For example, the topside enclosure 304 can be interconnected to an end of the tether 332, but can be separate from the structural member 324. In accordance with other embodiments, the topside enclosure 304 can be connected to the structural member 324, in addition to the tether 332. The tether 332 can be attached to an exterior of the structural member 324 of the intermediate assembly 320. Alternatively or in addition, at least portions of the tether 332 can be disposed within an interior of the structural member 324. In accordance with still other embodiments of the present disclosure, different components of the tether 332 can be routed differently. For example, a power cable component of the tether 332 can be routed separately from a signal cable component of the tether 332. The tether 332 can also include one or more optical fibers to carry optical signals between the topside enclosure 304 and the optical head 308. The structural member 324 of the intermediate assembly 320 can also provide mechanical support for the optical head 308, allowing an operator to position the optical head 308 such that a field of view of the included monitoring and inspection system 160 encompasses selected submerged components, including the reactor pressure vessel 108 and various other reactor components 106, while the optical head 308 is itself submerged, and while the operator is above the waterline.

The structural member 324 of the intermediate assembly 320 can be joined to the optical head 308 by a pan and tilt head 328. Although referred to herein as a pan and tilt head 328, the optical head 308 can be joined to the intermediate assembly 320 by a unit that provides only a pan or a tilt function, or solid brackets that provide no pan or tilt function. The pan and tilt head 328 can allow the optical head 308, and in particular the transmit and receive optics 420, to be pointed along a desired line of sight, such that a field of view 168 of the inspection system 160 encompasses, for example, a desired area of the reactor pressure vessel 108 or other component or structure within the reactor pool 104. In addition, the pan and tilt head 328 can be part of a crane or other system for placing the optical head 308 at a desired location within or adjacent a reactor or other structure, and for obtaining a desired viewing angle of that structure. The pan and tilt head 328 can include various actuators and motors that enable an orientation of the optical head 308 to be varied relative to an end of the structural member 324, in response to power and/or control signals supplied through lines included in the tether 332.

Figure 4A:
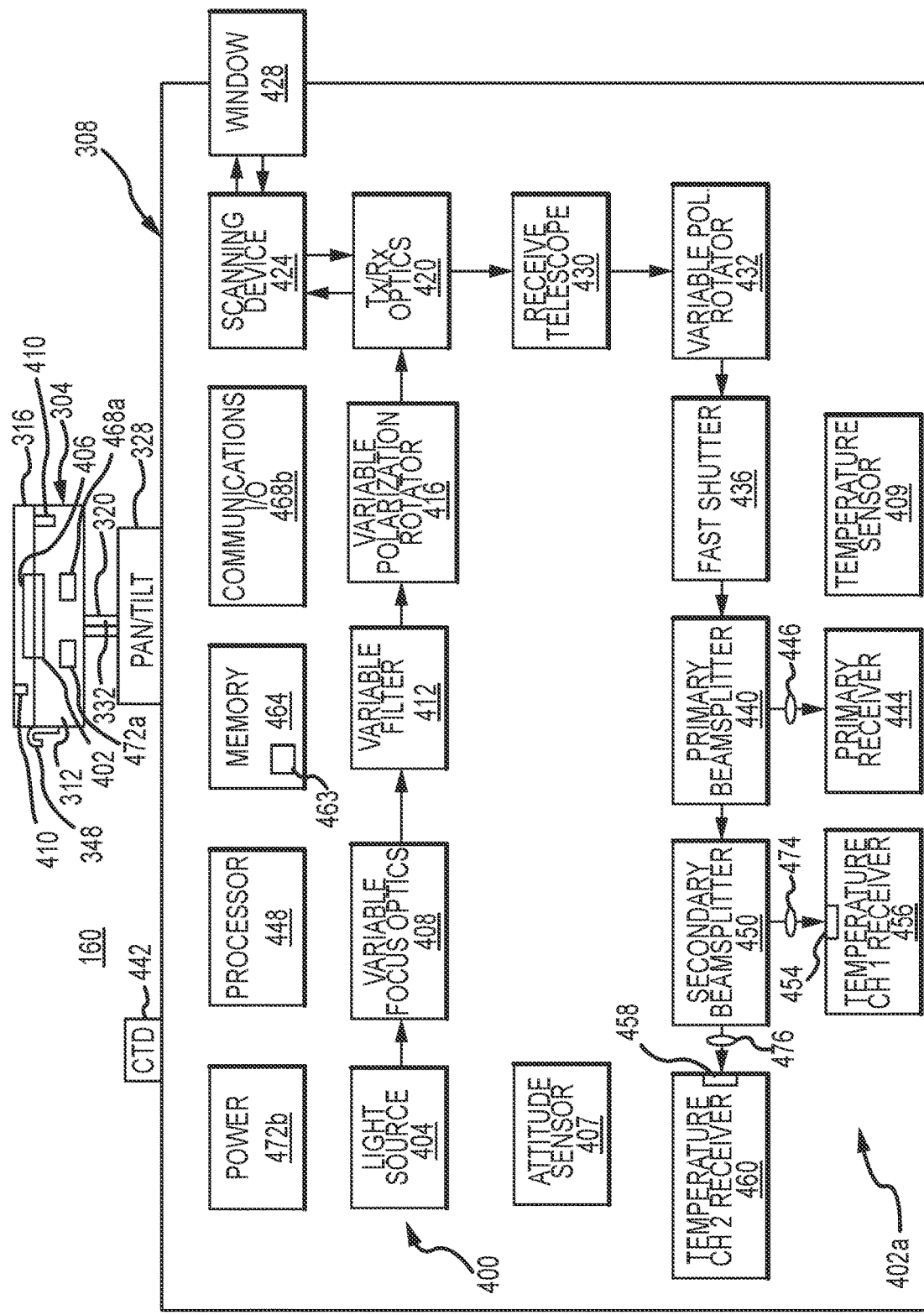
FIGS. 4A-4H depict components of monitoring and inspection systems in accordance with embodiments of the present disclosure.
Figure 4B:
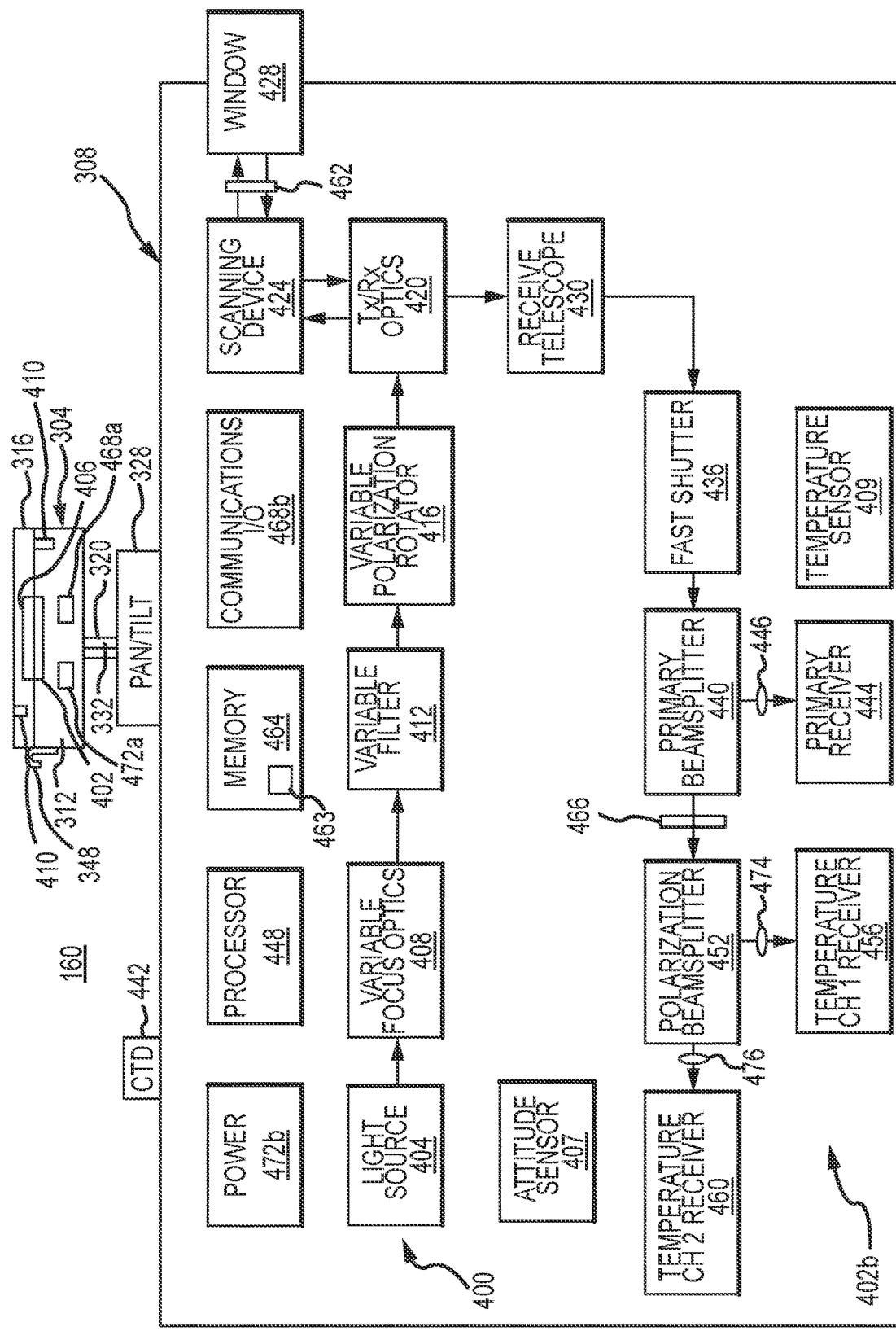

FIGS. 4A-4H are block diagrams depicting components of at least some embodiments of inspection systems 160 in accordance with the present disclosure. More particularly, FIGS. 4A and 4B depict embodiments with a reduced set of components disposed within the topside enclosure 304, at least as compared to the embodiments depicted in FIGS. 4C-4F, and with the remainder of the components contained within the optical housing or underwater pressure vessel 308. The inspection systems 160 of FIGS. 4A, 4C and 4E include a temperature measuring sub-system 402a that compares a ratio of Raman wavelength amplitudes within a return signal to measure temperature, while the inspection systems 160 illustrated in FIGS. 4B, 4D and 4F include a temperature measuring sub-system 402b that calculates a ratio of light in the return signal based upon polarization to measure temperature. One difference between the embodiments of FIGS. 4C and 4D as compared to those of FIGS. 4A, 4B, 4E and 4F is that the embodiment illustrated in FIGS. 4C and 4D dispose the light source 404 in the control box 304 and include an optical fiber 418 as part of the tether 332 of the intermediate assembly 320 to carry the light from the light source 404 in the control box 304 to the transmit and receive optics 420 in the optical housing 308. The embodiments depicted in FIGS. 4G and 4H include upper 308a and lower 308b optical housings, to facilitate configuring at least the lower optical housing 308b such that it can pass through relatively small apertures, such as flow holes formed in the lower core plate 120. Otherwise, the illustrated inspection systems 160 generally share components in common and can perform the same types of measurements. In accordance with still other embodiments of the present disclosure, various illustrated components need not be included. For instance, an inspection system 160 need not include components of a temperature measuring subsystem 402.

As generally shown in FIGS. 4A-4H, a monitoring and inspection system 160 in accordance with embodiments of the present disclosure includes a lidar device 400 or other optical metrology system. As can be appreciated by one of skill in the art, a lidar device 400 is an active optical system that operates to generate 3D point cloud data by transmitting light towards a target, receiving reflected light from the target, and determining the range to the target based upon time of flight information determined from the amount of time elapsed between the transmission of light from the light source 404 and the time at which the reflected light or return signal is received at the receiver 444. As used herein, a target can include an area or feature on a structure, including manmade structures and natural features or structures, 3-D targets mounted to a structure, and 2-D targets applied to a structure. In addition, the location of a target or of a point on the structure or component from which light is reflected can be located relative to the lidar device 400 or relative to other locations or points within the field of view 168 of the lidar device 400 in three-dimensional space by combining the range information with the known azimuth and elevation information via scanner location (e.g. as an azimuth angle and an elevation angle) for scanning lidar devices 400, pixel location for multi-pixel lidar devices 400, or a combination of the two. Accordingly, the 3D point cloud data obtained by an inspection system 160 can be accurately located within an absolute or a relative reference frame. Moreover, different sets of point cloud data can be combined, even where the different sets of point cloud data are obtained with the optical head 308 at different locations, or where the different sets of point cloud data are obtained by different optical heads 308. The fourth dimension, time, is also recorded so measurements and features can be compared over time. For non-lidar devices such as triangulation, structured light, holographic, stereo-scopic, and other camera-based systems, range information is derived from light intensity patterns on a camera. Embodiments of the present disclosure provide an inspection system 160 that can operate to measure and/or inspect components that are underwater and/or remote from an operator.

The components of the inspection system 160 thus include a light source 404. The light source 404 is configured to produce a beam that is provided to an output portion of an optical train or path that includes transmit/receive optics 420, either directly (across free space), via an optical fiber, and/or via various intervening components provided as part of the output portion of the optical train. Examples of intervening components include variable focus optics 408, a variable filter 412, and a variable polarization rotator 416. The light is then output through a window 428 in the watertight housing of the optical head 308. In accordance with at least some embodiments of the present disclosure, a scanning device 424 can be provided between the transmit/receive optics 420 and the window 428, to steer the transmitted beam of light within a field of view 168 of the lidar system 400. The window 428 can be hemispherical or cylindrical, to accommodate a portion of a scanning device 424 or an additional scanning mirror or other optical element, to provide a wide field of view 168 in at least one dimension. Moreover, the lidar system 400 can be implemented as a scanning lidar. Alternatively or in addition, the lidar system 400 can be implemented as a flash lidar that includes a multiple pixel primary receiver 444.

As can be appreciated by one of skill in the art after consideration of the present disclosure, the lidar system 400 receives a return signal in the form of light transmitted from the lidar system 400 that has been reflected from a target, other structures or components, or the medium, such as water, through which the beam of transmitted light and the reflected light travels between the lidar system 400 and the target, object, or medium. At least a portion of reflected light received at the window 428 is passed to the transmit/receive optics 420 and from there to a return signal portion of the optical path or train that includes the receiver 444. Where a scanning device 424 is included in the optical train, that device can control exactly where in the field of view 168 reflected light is accepted and passed to the receiver 444. As discussed in detail elsewhere herein, additional components can be included in the return signal portion of the optical train, such as beamsplitters and additional receivers, for obtaining additional information from return signals, including information that enables the lidar system 400 to perform remote temperature measurements.

The light produced by the light source 404 can be collimated or variably focused by variable focus optics 408. In accordance with at least some embodiments of the present disclosure, the light source 404 is a pulsed beam laser. As can be appreciated by one of skill in the art after consideration of the present disclosure, the light source 404 can produce light having a selected wavelength or range of wavelengths. As an example, but without limitation, the light source 404 may comprise a red-blue-green laser light source. As a further example, the light source 404 may have an output centered at 532 nm. Other wavelengths can also be used, for example to optimize performance in response to various water conditions. For instance, in highly turbid water, red wavelengths can have better performance at short ranges compared to green wavelengths. In accordance with still other embodiments, the light source 404 may produce non-collimated light. In accordance with still further embodiments, the light source 404 may be light emitting diode (LED) based, continuous wave (CW) laser based, modulated CW based, structured light, or some other light source.

The variable focus optics 408 can include traditional mechanical focusing elements, or non-mechanical elements, such as may be provided by fluid lenses, liquid crystal devices, electro-optic devices, and other optical elements. The ability to focus the beam of light output from the light source 404 can be used to optimize signal return for a specific target at a specific range for specific water conditions. It can also be used to create a smaller spot size at the target plane, which can increase the spatial resolution of the resulting point cloud. The light can then be adjusted in magnitude by a variable filter or attenuator 412. This is advantageous for underwater sensing as the attenuation of seawater or other water bodies can vary dramatically, thus dramatically changing the return signal, which can strain the dynamic range of the receiver. One method for reducing the required dynamic range of the receiver is to adjust the light output power from the transmitter. This can be achieved by the variable attenuator 412. As examples, the variable attenuator 412 can include standard neutral density filters, other attenuation filters, an optical fiber switch, electro-optical device, liquid crystal device, acousto-optic device, or polarization elements. Alternatively, the electrical drive current of the laser or pump diodes can be adjusted to modify the transmitter output power.

The optical train can also include a variable polarization rotator 416. It is known that the polarization of the transmitted light can affect the backscatter power, which is a source of noise at the lidar device 400 receiver. Transmission range can therefore be optimized by adjusting the polarization rotation of the output light. In addition, when performing non-destructive evaluation (NDE) inspections of welds or other fine features of metal objects, polarization adjustments of the output laser and input reflected light can increase the contrast of any defects. In the inspection systems 160 of FIGS. 4A, 4C and 4E, in which a ratio of the amplitude of different selected wavelengths within a return signal is used to measure temperature, the variable polarization rotator 416 can impart any polarization to the output light. In the inspection systems 160 of FIGS. 4B, 4D and 4F, the variable polarization rotator 416, if included, can provide either a left hand circular or right hand circular polarization (in combination with a quarter wave plate 462), as some type of circular polarization is needed in order to compare polarization ratios in a return signal for temperature measurement in that embodiment.

Transmit and receive (Tx/Rx) optics 420 are used to make the lidar system 400 of the inspection system 160 monostatic. Monostatic sensors have the distinct advantage of simplified scanning as the transmitter and receiver are pointed at the same location with the same scanning mechanism, resulting in calibration and reliability performance that is superior to bistatic systems. That said, bistatic configurations are still included as an option in this disclosure. The transmit and receive optics 420 can include refractive and/or reflective and/or polarization selective lenses or elements. Moreover, the transmit and receive optics 420 can be configured with a zoom capability, to vary a field of view 168 angle of the lidar system. A scanning device 424 can then be used to accurately direct the transmitted beam and the field of view of the receiver simultaneously to a scene through a window 428 in the housing 308. The scanning device 424 can include a steering mirror (such as galvanometer or spinning monogon or polygon mirrors), or other beam steering device, such as a prism, Risley prism, voice coil, fast steering mirror, a micro-electro-mechanical system (MEMs), liquid crystal, liquid crystal meta-surfaces, acousto-optic, Optical Phased Array (OPA), Serpentine OPA, electro-optic device, or any combination thereof, for precise control of the pointing of the light source and receiver toward a target, such as an underwater structure or component in the nuclear reactor pressure vessel 108 at known angles relative to the inspection system 160.

Figure 4C:
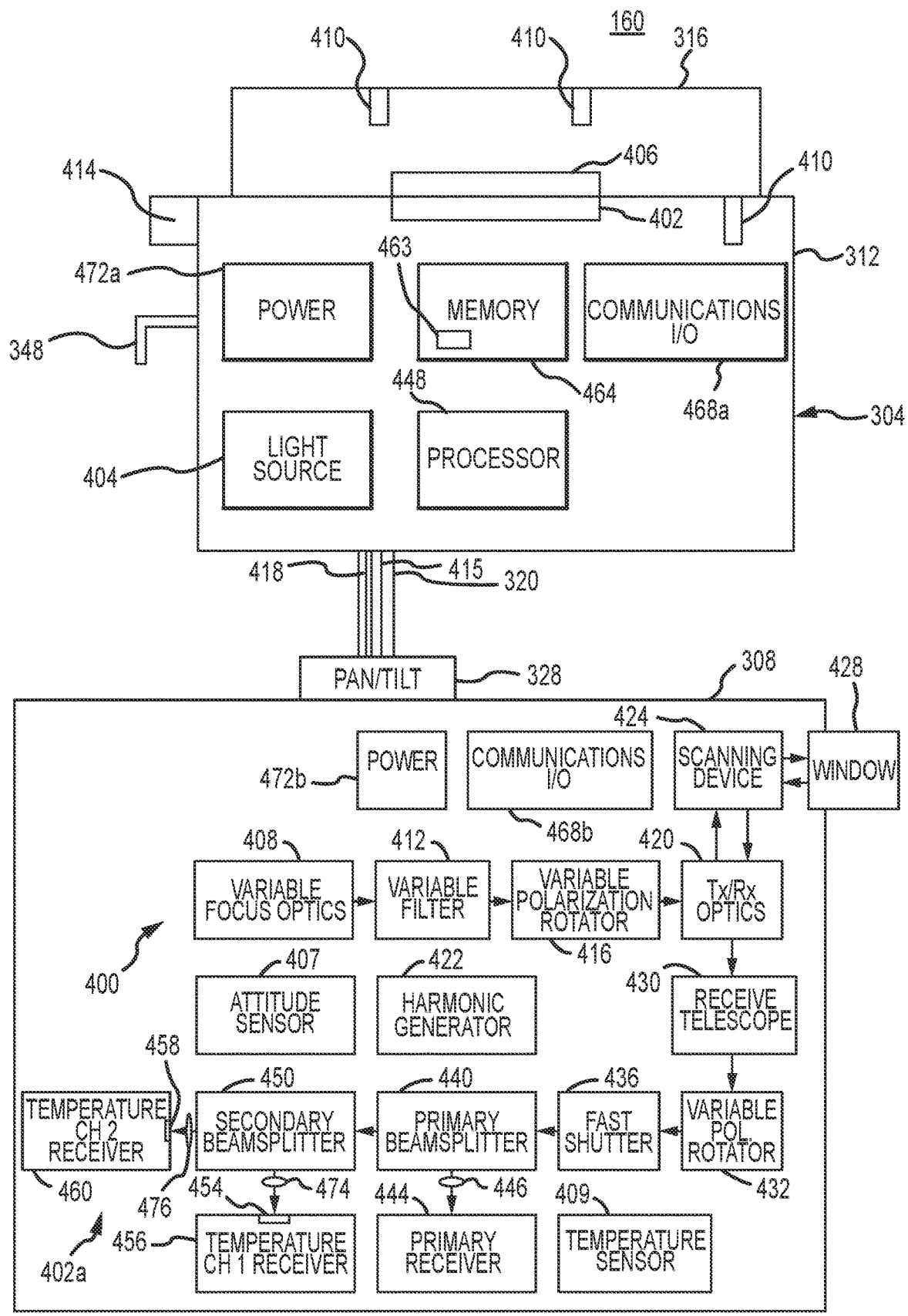
Figure 4D:
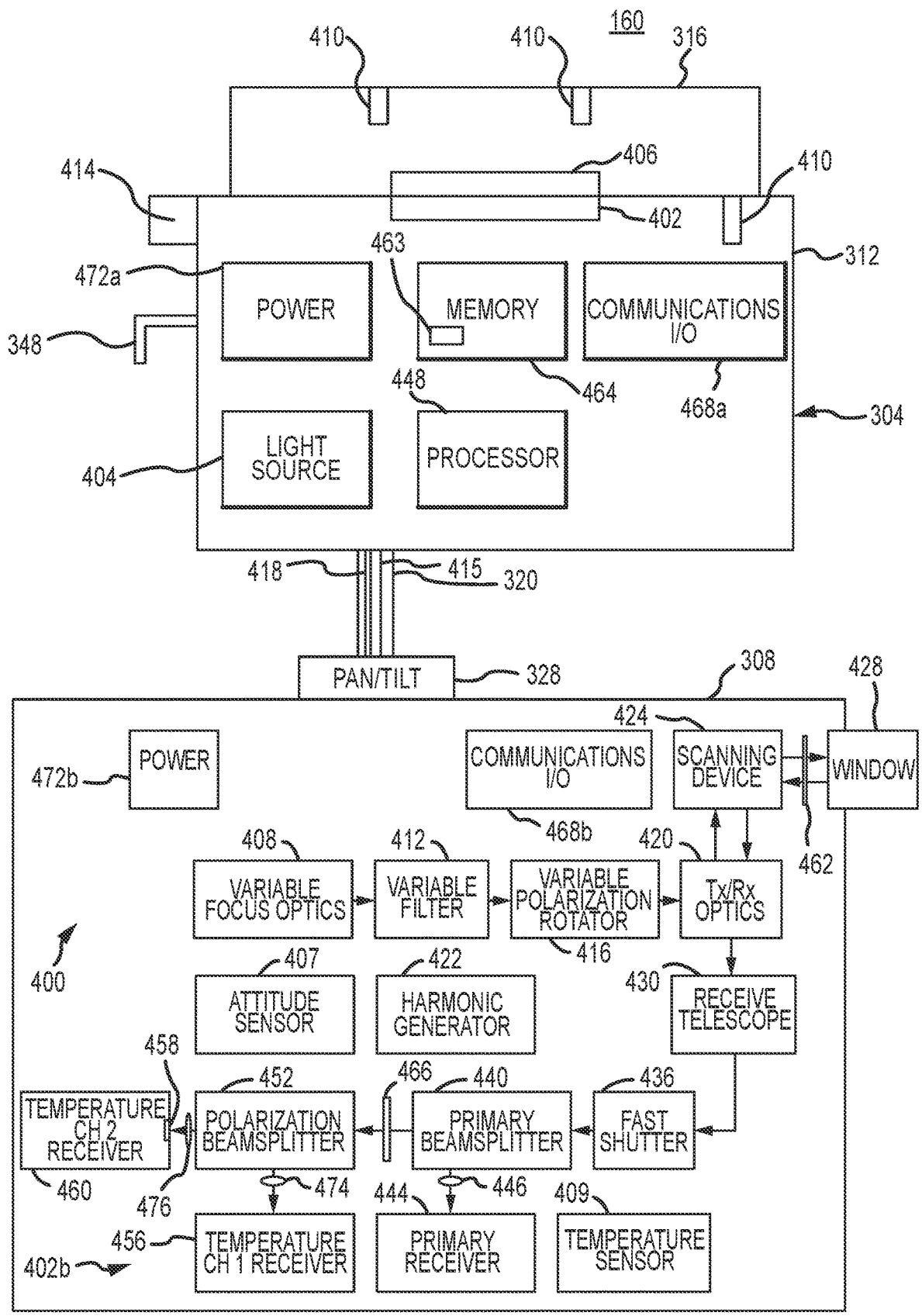
Figure 4E:
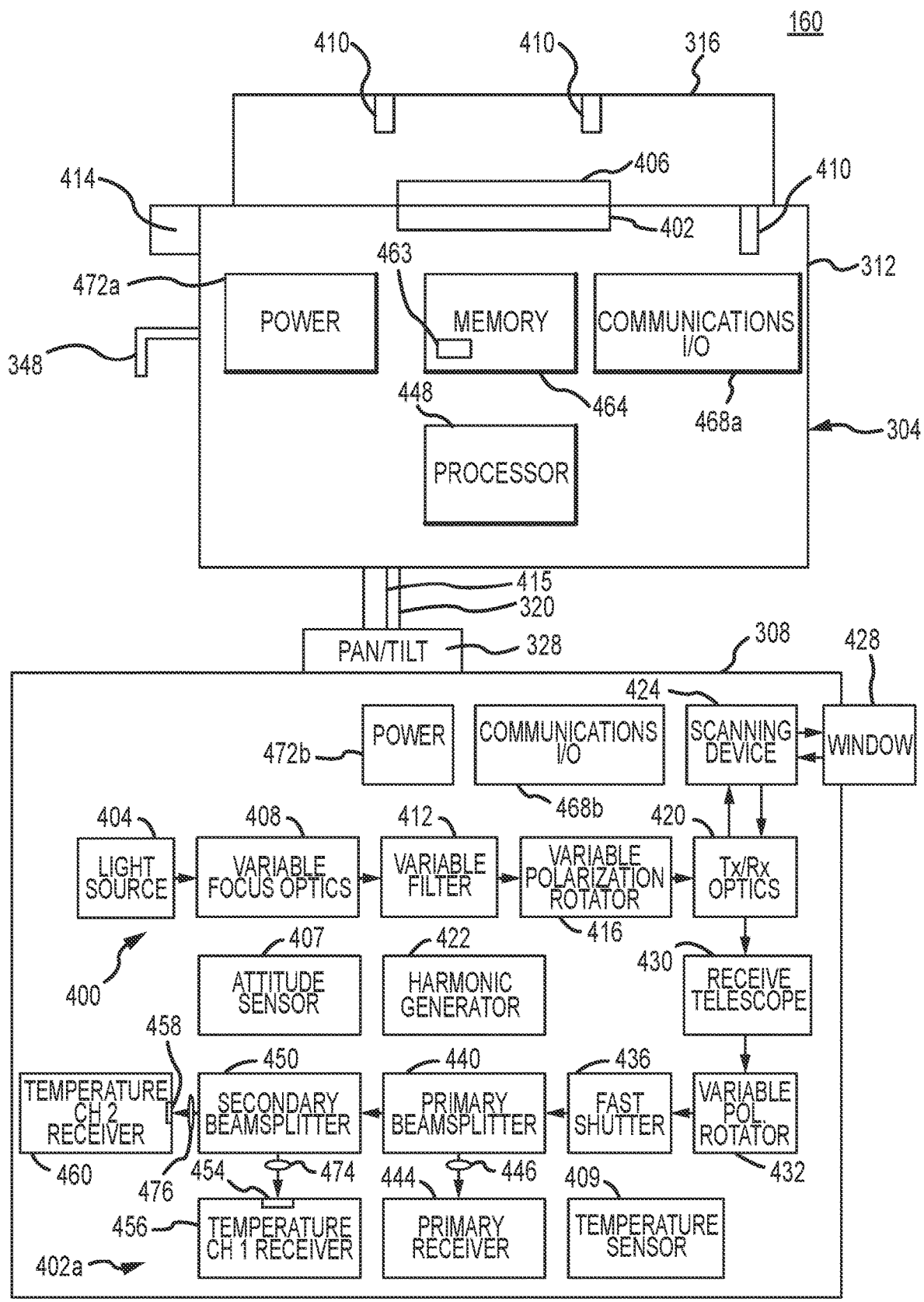
Figure 4F:
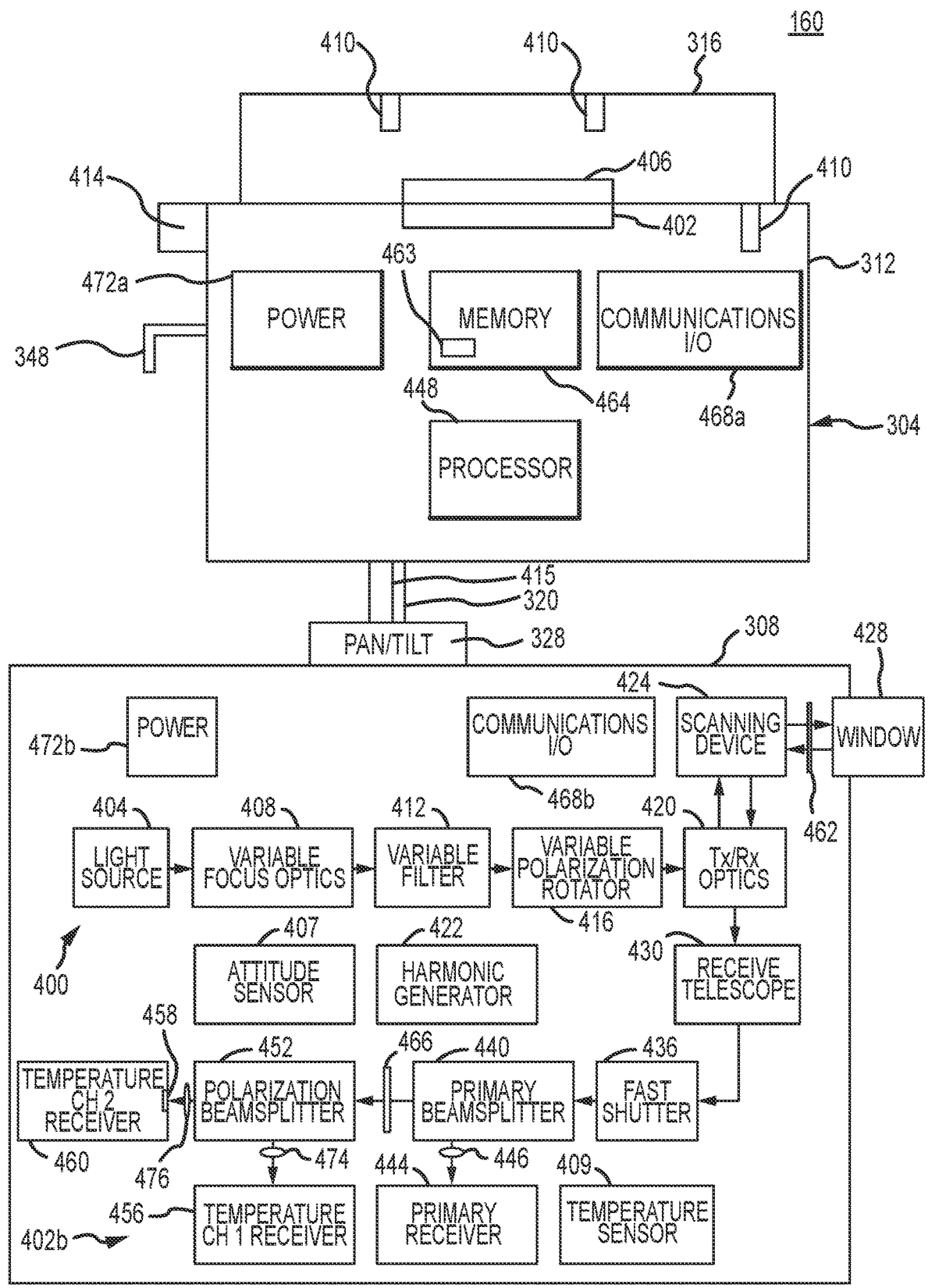

Light reflected from the target is received by the scanning device 424 and is split by a beam splitter element included in the Tx/Rx optics 420. Light from the Tx/Rx optics 420 is provided to a receive telescope 430, which is configured to focus the received light so that it can be imaged onto the sensor elements of various receivers 444, and/or 456, and 460 included in the inspection system 160. In the inspection system 160 that includes a wavelength based temperature measuring sub-system 402a (e.g., as shown in FIGS. 4A, 4C and 4E,), a variable polarization rotator 432 can be used to optimize the signal-to-noise ratio (SNR) of the return signal by selecting the optimal polarization for the hard target return. In the inspection system 160 that includes a polarization based temperature measuring sub-system 402b (e.g., as shown in FIGS. 4B, 4D and 4F,), the variable polarization rotator 432 is omitted.

A fast shutter 436 can be provided to block any stray light from the primary beam as it exits the window 428, after being directed by the scanning device 424. The fast shutter 436 is timed with high speed electronics, which may be implemented by a processor 448, to block the window 428 reflection from a transmitted pulse and then open quickly to capture returns from close targets. A primary beam splitter 440 splits off a portion of the return signal and directs it to the primary receiver 444. The primary beam splitter 440 may be in the form of a chromatic or achromatic beam splitter. For example, the primary beam splitter 440 may comprise a chromatic beam splitter that provides light at the primary wavelength output by the light source to the primary receiver 444, and that provides the remaining light to the temperature measuring sub-system 402. Alternatively, the primary beam splitter 440 could be a mirror if the temperature sub-system 402 is not included.

The primary receiver 444 is used for the range, vibration, and leak detection measurements that can be made by the lidar system 400. The primary receiver 444 includes an optical sensor or detector, such as a photodiode, an avalanche photodiode, a photomultiplier tube, a silicon photomultiplier tube, a Geiger mode avalanche photodiode, charge coupled device (CCD) detector, complementary metal oxide semiconductor (CMOS) detector, or other optical detector. It can also include an electronic amplifier, Read Out Integrated Circuit (ROIC) and/or thermal control elements and circuitry. In addition, the primary receiver 444 can include or be associated with a narrow band filter to reduce background light. A focusing optic 446 can be included to focus light from the beam splitter 440 onto the sensor of the primary receiver 444. In accordance with embodiments of the present disclosure, the primary receiver 444 may comprise a single or multiple pixel sensor.

Information regarding the range to the target is monitored by a processor 448, which controls and/or has access to information regarding the time at which transmitted light is output, and the time at which a return signal, comprising transmitted light that has been reflected from a target, is received by the primary receiver 444. In addition, information from the scanning device 424, from a pan and tilt head 328, and/or the location of a receiving pixel in a lidar device 400 or camera having a multiple pixel primary receiver 444 can be used by the processor 448 to determine the azimuth angle and elevation angle to the target. This information can then be combined with timing information, and in particular the time at which the transmitted pulse of light produced by the light source 404 is sent towards the target, and the time that the return signal is received at the primary receiver 444. The range measurement determined from the timing information can then be applied to obtain a location of the target relative to the inspection system 160. As can be appreciated by one of skill in the art after consideration of the present disclosure, the primary receiver 444 also provides information regarding the intensity of the return signal, which can be analyzed in connection with determining, for example, whether the return is from an underwater structure, water, or a plume of fluid. Moreover, the intensity may be provided from the primary receiver 444 as a voltage signal.

The processor 448 can include any processor capable of performing or executing instructions encoded in system software or firmware 463 stored in data storage or memory 464, such as a general purpose programmable processor, controller, Application Specific Integrated Circuit (ASIC), Field Programmable Gate Array (FPGA), System on Chip (SoC), RFSoC, or the like. Moreover, the execution of that software or firmware 463 can control the operation of the lidar system 400, including the acquisition of point cloud data that includes azimuth angle, elevation angle, intensity, and range information taken from an underwater scene. The execution of the software 463 by the processor 448 can be performed in conjunction with the memory 464, including the short or long-term storage of timing information, range information, point cloud data generated by the inspection system 160, control point locations, object identification information, component identification information, or other control information or generated data. The memory 464 can comprise a solid-state memory, hard disk drive, a combination of memory devices, or the like. The inspection system 160 can additionally include various sensors. For example, the inspection system 160 can include a conductivity, temperature, and depth (CTD) device 442 for measuring the conductivity, the temperature, and the depth of the water at the location of the inspection system 160. Because a CTD device 442 must be in direct contact with the surrounding water, it can be mounted outside of or adjacent an aperture in the enclosure 700. Alternatively or in addition, a temperature sensor 409, such as a thermistor, thermocouple, resistance temperature detector (RTD), or other temperature measuring device can be mounted to the optical head 308. These are also mounted outside or adjacent an aperture in the enclosure to enable direct contact with the surrounding water. This can be permanently mounted, or can be mounted to a connector so it is removeable if damaged.

In addition, an inertial navigation system (INS) or some part of an INS system, such as an attitude sensor 407, can be mounted inside the optical head 308. This attitude sensor 407 enables multiple added capabilities. First, it measures the angle of the sensor to gravity so the data can be transposed to true gravity. Second, it measures any motion of the optical head 308 and that data can be used to compensate for that motion in post processing. This is particularly important if the optical head 308 is deployed with a structural member 324 in the form of a long pole 324, which inherently introduces a long mechanical moment arm to the inspection system 160. As a n example, but without limitation, a "long" pole can be a pole that extends at least 5 m. Third, the attitude sensor 407 provides information regarding the orientation of the optical head 308 between scans, for instance if the optical head 308 is mounted on a pan or pan/tilt head 328, and there is intended movement between scans, the INS/attitude sensor 407 measures that movement, which can assist with combining different sets of point cloud data obtained by the lidar system 400. This enables automation of the data integration and registration process, thus reducing time to final results. As examples, but without limitation, the attitude sensor 407 can be in the form of a micro-electromechanical system (MEMS) gyroscope or accelerometer.

As can be appreciated by one of skill in the art, the Raman return from water molecules can be used to determine the temperature of the water. Typically, this requires a full spectrometer to analyze the spectrum of the Raman return. In accordance with embodiments of the present disclosure, temperature measurements are performed by comparing two spectral channels or two polarization channels. Either of these approaches are allowed by a inspection system 160 in accordance with embodiments of the present disclosure that incorporates a temperature measuring sub-system 402, as described herein.

Moreover, the temperature measurement subsystem 402 can measure the temperature of water at a distance from the inspection system 160. In particular, range resolved temperature measurements can be taken using a temperature measurement sub-system 402 provided as part of the inspection system 160. A 3D temperature profile can therefore be included as part of or as a supplement to the 3D point cloud data of the locations of structures or components. The 3D temperature information can also be used to assist in the accurate creation of a 3D image or model of a structure or component by enabling corrections or adjustments to the point cloud data based on temperature dependent alterations to the refractive index of the water through which the light is traveling. In accordance with embodiments of the present disclosure, the temperature measurement subsystem generally includes a secondary beam splitter 450 or a polarization beam splitter 452 that divides the signal received from the primary beam splitter 440 into a first channel provided to a first temperature channel receiver 456 and a second channel that is provided to a second temperature channel receiver 460. First 474 and second 476 focusing optics can be included to focus light from the beam splitter 450 onto the respective temperature channel receivers 456 and 460.

In a monitoring and inspection system 160 that includes a temperature measurement sub-system 402a that uses different wavelengths for temperature measurement (see FIGS. 4A, 4C and 4E), the secondary beam splitter 450 used to divide the return signal into two channels may comprise a chromatic or an achromatic beam splitter. A first one of the channels is passed through a first narrowband filter 454 before being provided to a first temperature channel receiver 456. A second one of the channels is passed through a second narrowband filter 458 before being provided to a second temperature channel receiver 460. The passband of the first narrowband filter 454 is selected to encompass a first Raman wavelength, while the passband of the second narrowband filter 458 is selected to encompass a second Raman wavelength. For example, where the transmitted light from the light source 404 has a wavelength of 532 nm, the first passband can be about 10 nm wide and can be centered at a wavelength of about 640 nm, and the second passband can be about 10 nm wide and can be centered at a wavelength of about 655 nm, where "about" is +/−10% of the stated value. The temperature channel receivers 456 and 460 are optical detectors. The temperature channel receivers 456 and 460 can thus include a photodiode, CCD detector, CMOS detector, an avalanche photodiode, a photomultiplier tube, a silicon photomultiplier tube, a Geiger mode avalanche photodiode, or other optical detector. As a further example, the temperature channel receivers 456 and 460 can comprise single element or multi-pixel sensors. The temperature channel receivers 456 and 460 can also include an electronic amplifier, Read Out Integrated Circuit (ROIC), thermal control elements and circuitry, focusing optics, or other components. As can be appreciated by one of skill in the art after consideration of the present disclosure, the ratio of the amplitude of the signal comprising the first Raman wavelength detected at the first temperature channel receiver 456 to the amplitude of the signal comprising the second Raman wavelength detected at the second temperature channel receiver 460 gives the temperature of the water at a selected range and angular location.

In a monitoring and inspection system 160 that includes a temperature measurement sub-system 402b that measures a ratio of differently polarized light for temperature measurement (see FIGS. 4B, 4D and 4F), linearly polarized light from the light source 404 is passed through a first quarter wave plate 462, which can be located before or after the scanning device 424, to produce a circularly polarized output beam. A second quarter wave plate 466 converts circularly polarized light in the return signal to linearly polarized components. If the target reflection reverses the circular polarization, then a second quarter wave plate 466 is not needed. A polarization beam splitter 452 then divides the portion of the return signal received from the primary beam splitter 440 into two channels according to the polarization of the received light. A first one of the channels, comprising light of a first polarization (e.g. vertically polarized light), is provided to a first temperature channel receiver 456. A second one of the channels, comprising light of a second polarization (e.g. horizontally polarized light), that is opposite the polarization of the light in the first channel, is provided to a second temperature channel receiver 460. The temperature channel receivers 456 and 460 are optical detectors that each receive one of the oppositely polarized signals. The temperature channel receivers 456 and 460 can thus include a photodiode, CCD detector, CMOS detector, an avalanche photodiode, a photomultiplier tube, a silicon photomultiplier tube, a Geiger mode avalanche photodiode, or other optical detector. As a further example, the temperature channel receivers 456 and 460 can comprise single element or multi-pixel sensors. The temperature channel receivers 456 and 460 can also include an electronic amplifier, Read Out Integrated Circuit (ROIC), thermal control elements and circuitry, focusing optics, or other components. As can be appreciated by one of skill in the art after consideration of the present disclosure, the ratio of the amplitude of the signal from the light of the first polarization detected at the first temperature channel receiver 456 to the amplitude of the signal from the light of the second, opposite polarization detected at the second temperature channel receiver 460 gives the temperature of the water at a selected range and angular location.

The topside enclosure or control box 304 includes a sealed enclosure 312. The sealed enclosure 312 can contain at least a top side communications interface 468a and a top side power supply or converter 472a. The communications interface 468a can include an Ethernet switch, RS-232, or other wireline communications connection. Alternatively or in addition, the communications interface 468a can include a WiFi, Bluetooth, optical, or other wireless communication transceiver. Where the communications interface 468a provides a wireline connection, it can include a connector, such as but not limited to an RJ-45 jack, on an exterior of the sealed enclosure 312, with other components or portions remaining on an interior of the sealed enclosure 312. In accordance with embodiments of the present disclosure, the top side communication interface 468a is in communication with an optical head 308 communication interface 468b through a signal line provided as part of the tether 332. The topside power converter 472a can include an AC (e.g., common wall power) to DC (e.g., 24V) converter. The topside power converter 472a can also include a wireline connection to an external power source that exits through a sealed aperture in the housing of the sealed enclosure 312. Transformers or other components of the power converter 472a are disposed within the interior of the sealed enclosure 312. In accordance with at least some embodiments of the present disclosure, the power converter 472a can be replaced or supplemented by a battery disposed within the sealed enclosure. The topside power converter 472a can supply power to components disposed as part of the control box 304, and further can supply power to an optical head power distribution network 472b in the optical head 308 through a power supply line included in the tether 332. The power distribution network 472b can include one or more power converters, and can supply power to components disposed as part of the optical head 308. Power and communications signals can be passed between the control box 304 components and the underwater optical housing 308 by power and signal lines 415 included as part of the tether 332.

In accordance with further embodiments of the present disclosure, the control box 304 can additionally include a cooling unit 316. The cooling unit 316 can be configured so that it is in thermal contact with the sealed enclosure 312. In at least some embodiments of the present disclosure, a first heat sink 402 can be disposed within the sealed enclosure 312, and a second heat sink 406 can be disposed within the cooling unit 316. A thermal connection between the heat sinks 402 and 406 can be established through direct contact at an interface between the sealed enclosure 312 and the cooling unit 316. As an example, the portions of the sealed enclosure 312 and the cooling unit 316 adjacent or comprising the heat sinks 402 and 406 can be formed from thermally conductive materials. In accordance with other embodiments, one or both of the sealed enclosure 312 and the cooling unit 316 can be provided with thermally conductive panels or areas adjacent the heat sinks 402 and 406. Cooling fans 410 can be included in the cooling unit 316, to pass air through the cooling unit and thus promote the removal of heat from the control box 304 through the thermal connection established by the heat sinks 402 and 406. This configuration has the advantage of protecting the components of the control box 304 disposed within the sealed enclosure 312 from potential contamination from the environment in which the inspection system 160 is operated. In accordance with further embodiments of the present disclosure, the cooling unit 316 is also a sealed unit, in which case any fans 410 included as part of the cooling unit 316 circulate air within that unit; air is therefore not exchanged between the interior of the cooling unit 316 and the surrounding environment. Alternatively or in addition, other cooling components can be included within the sealed enclosure 312 as opposed to using a cooling unit 316, or in addition to a cooling unit 316. These cooling components can include, but are not limited to fans 410, thermo-electric coolers, heat pipes, and heat sinks. A heat sink can include or can be thermally connected to heat sink fins 414 that extend from an exterior of the enclosure 312. These can transfer heat to outside of the sealed enclosure 312 through thermal interfaces, for example where heat sink fins 414 are in the open environment, as an alternative or in addition to inside a cooling unit 316.

In the additional embodiments illustrated in FIGS. 4C and 4D, the light source 404 is located within the top side control box 304, rather than in the subsea or optical housing 308. The light is brought from the light source 404 in the control box 304 to the underwater optical housing 308 via an optical fiber 418 included as part of the tether 332. This light can be the final wavelength, or an intermediary wavelength. For instance, the topside enclosure 304 can contain a light source 404 in the form of an infrared (IR) laser (e.g. outputting a wavelength of 1064 nm) and the optical housing 308 can contain a second harmonic generator 422 that converts the IR light to visible light (e.g. converts the light having a wavelength of 1064 nm to light having a wavelength of 532 nm). The optical fiber 418 can thus extend from the light source 404 in the sealed enclosure 312 to the harmonic generator 422 in the optical head 308. The visible light that is output from the harmonic generator 422 can then be provided to the transmit/receive optics 420, for transmission through the window 428, to a target or targets within the field of view 168 of the inspection system 160 lidar 400. The advantage of keeping all or part of the light source 404 in the topside enclosure 312 is the underwater housing 308 can remain smaller in size and weight. Moreover, this advantage is significant, as the optical housing or head 308 is typically hand deployed over a handrail, so size and weight need to remain low. In addition, the water in a reactor 106 is typically very warm (sometimes up to 120° F.) so keeping submerged components cool can be a challenge, while keeping the topside enclosure 304 cool is easier.

The topside enclosure 304 in accordance with at least some embodiments, such as those illustrated in FIGS. 4C-4F, also contains the processing electronics, such as the processor 448 and memory 464. This arrangement provides the additional advantage of keeping heat-producing components out of the hot reactor water. In addition, anything lowered into the reactor pool 104 becomes exposed to radiation and potential contamination. The least amount of assets lowered into the water is better for reliability, re-workability, and cost.

In various embodiments, the optical head 308 can include the transmit/receive optics 420 and a primary receiver 444. In accordance with at least some embodiments of the present disclosure, the optical head 308 can include primary 440 and secondary 450 and first 456 and second 460 temperature channel receivers, as in other embodiments of the present disclosure. Also, various other components, such as but not limited to a scanning device 424, receive telescope 430, variable polarization rotator 416, variable focus optics 408, variable filter 412, communications interface 468b, light source 404, and enclosure window 428, can be provided as part of the optical head 308. In accordance with further embodiments of the present disclosure, the optical head 308 can include a scanning mirror or device 424, for example as part of the transmit/receive optics 420, to enable selected points or areas within a volume to be scanned, without necessarily requiring movement of the optical head 308 itself. In other embodiments, various described elements need not be included. For example, as illustrated in FIGS. 4C and 4D, the light source 404 can be included in the topside enclosure 312. As still another example, the lidar system 400 components can be simplified. For instance, a scanning device 424, variable focus optics 408, variable filter 412, variable polarization rotator 416, temperature measurement subsystem 402, or other components need not be included.

For instance, at least some embodiments of the present disclosure feature a lidar system 400 that provides three dimensional point cloud data, but that does not include a capability to perform temperature measurements. In such embodiments, the components required for such measurements, such as a variable polarization rotator 432, secondary beamsplitter 450, polarization beamsplitter 452, and/or first 456 and second 460 temperature receivers, can be omitted. Moreover, various other components can be omitted or added, according to the desired capabilities of the inspection system 160. In accordance with further embodiments the optical head 308 could have minimal components such as only the Tx/Rx Optics where all light generation and light detection components are located in the topside enclosure 304.

Figure 4G:
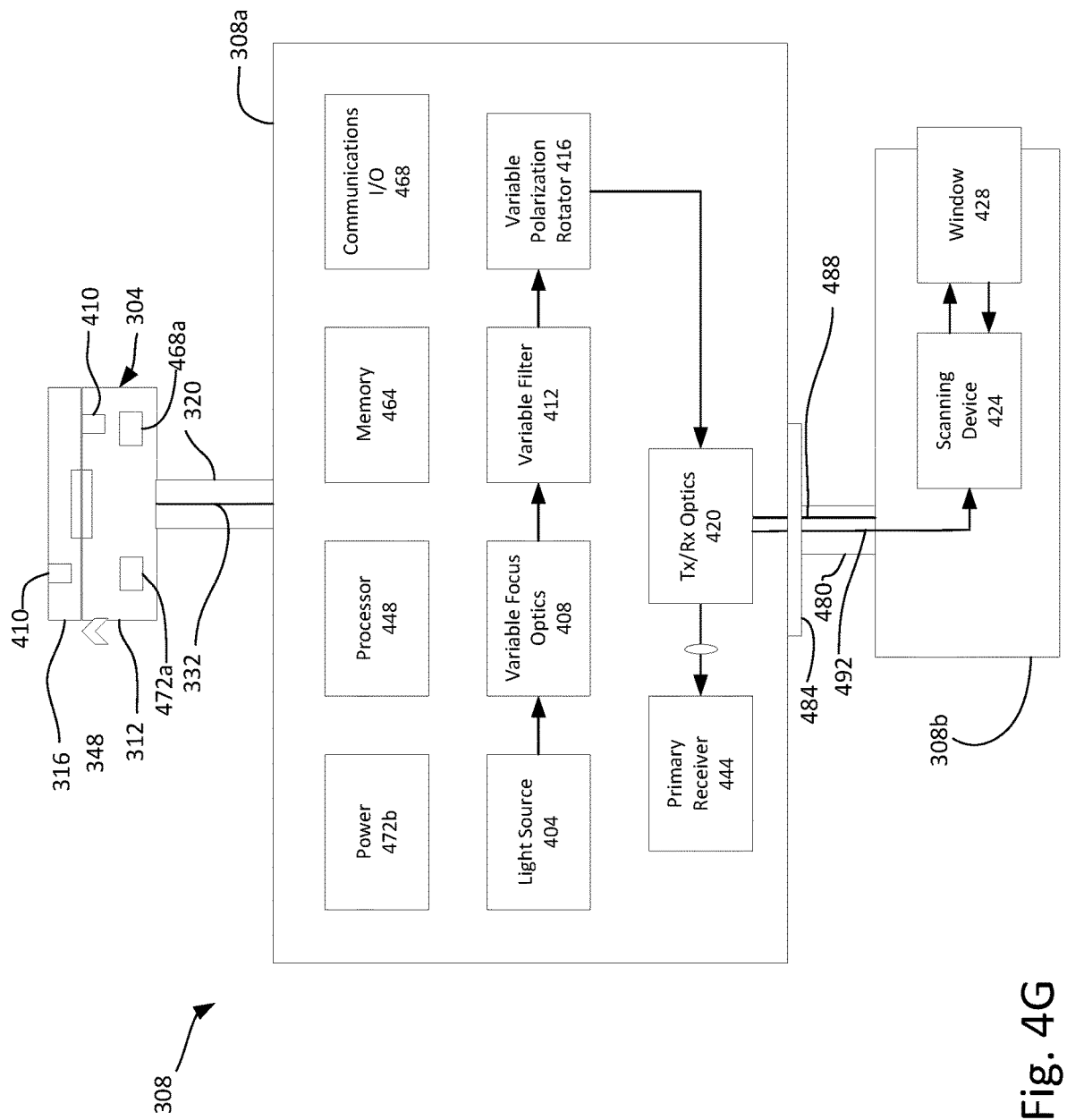

In accordance with at least some embodiment of the present disclosure, the optical head 308 is sized so as to fit through various passages and holes in the reactor 106, such as flow holes formed in a core plate 120. In accordance with still other embodiments, for example as illustrated in FIGS. 4G and 4F, the optical head 308 can include an upper optical head housing 308a and a lower optical head housing 308b, with at least the lower optical head housing 308b sized so as to fit through flow holes or the like. As shown, the lower optical head housing 308b can be connected to the upper optical head housing 308a via an auxiliary shaft 480 and a pan unit 484. Components within the upper 308a and lower 308b optical head housings can be connected by signal and power lines 488.

Figure 4H:
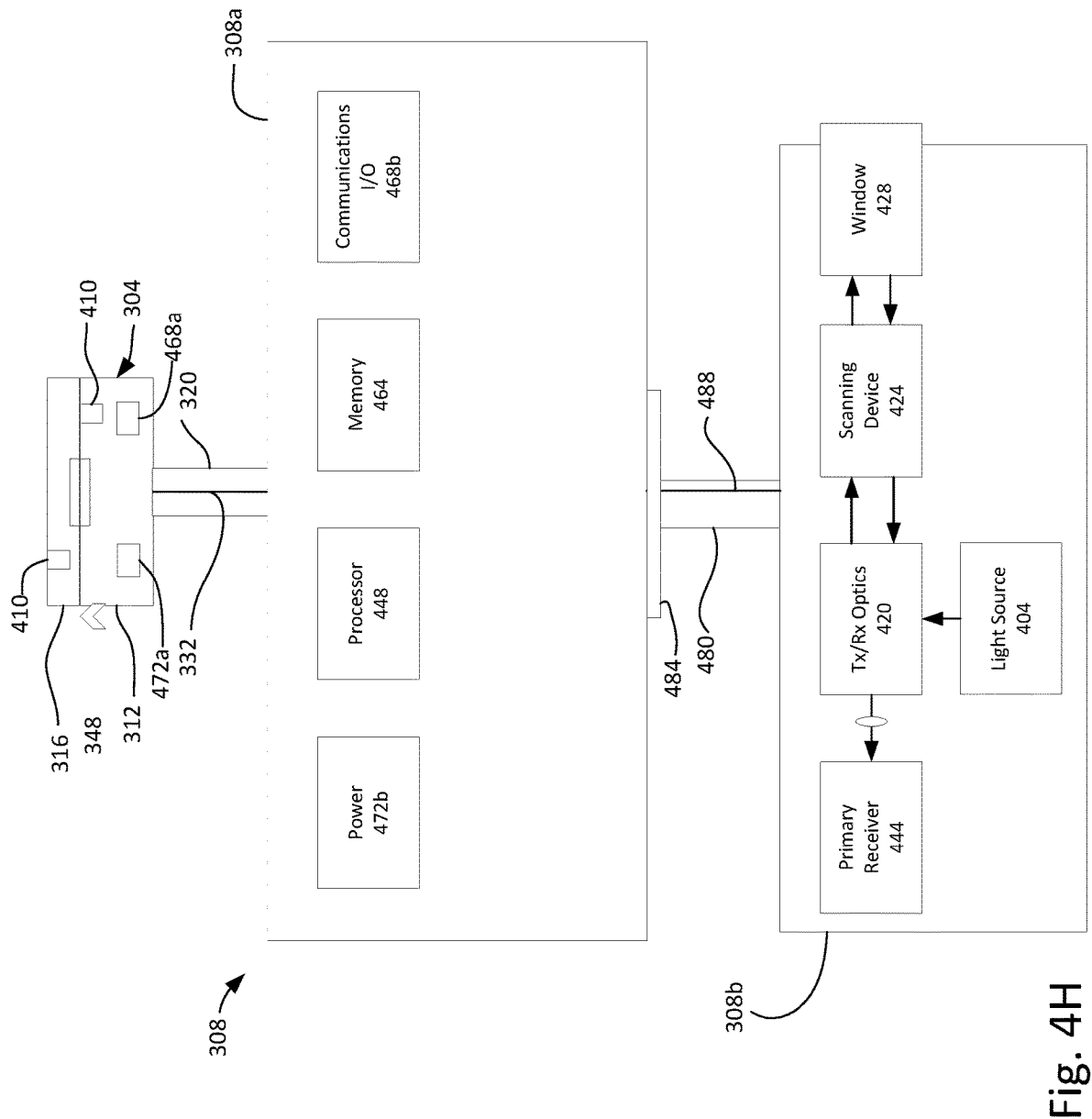

In addition, different embodiments can have different distributions of components between the upper 308a and lower 308b optical head housings. For instance, as illustrated in FIG. 4G, a minimal set of components, including the window 428 and a scanning device 424, with transmit 492a and receive 492b optical fibers extending between the transmit/receive optics 420 and the scanning device 424. Alternatively, a single optical fiber 492 for both transmit and receive operations can be provided. Another example distribution of components is shown in FIG. 4H. In accordance with still other embodiments, other distributions or sets of components can be included in the different housings 308 and 312. Moreover, although not shown in FIGS. 4G and 4H, temperature measurement subsystems 402 can be included.

In any of the embodiments, the window 428 can be hemispherical. A hemispherical window 428 enables the positioning of a scanning device 424 or an additional scanning mirror such that a hemispherical (180 degree or near (i.e. +/−10 degrees)) scanning radius is supported for a given orientation of the optical head 308.

Moreover, in any of the embodiments, the window 428 can be a cylindrical window where it is a similar shape as a tubular housing. A cylindrical window 428 enables the positioning of a scanning device 424 or an additional scanning mirror such that closer to 360 degrees (300 degree or near (i.e. +/−10 degrees)) scanning radius is supported for a given orientation of the optical head 308.

In accordance with further embodiments of the present disclosure, a single topside enclosure 304 and associated components can be operably connected to multiple optical housings or heads 308. The multiple optical housings 308 can be operated simultaneously, to reduce the total amount of time required to complete the acquisition of point cloud data from a volume. The different optical housings 308 can be connected to one or more structural members 324.

A key advantage of a monitoring and inspection system 160 architecture incorporating a lidar system 400 in accordance with embodiments of the present disclosure is that the range and angle from the lidar device 400 of the inspection system 160 to the target are known. This in turn allows the thermal measurements to be optimized at particular points in space, thus improving the SNR for the thermal measurement and targeting the exact location of interest. For example, when the location (angle, angle, and range) of a pipe joint or weld seam relative to the inspection system 160 is known exactly, then a location within the water volume immediately adjacent (e.g. above) that exact location can be selected for the temperature measurement by pointing a lidar system 400 at the location. Furthermore, the return signal can be gated to only receive signal from a range corresponding to the selected location within the water, as opposed to the entire water path, thus improving the signal to noise ratio. As another advantage, embodiments of the present disclosure provide for simultaneous or near simultaneous monitoring of movement and temperature of an underwater structure using a single inspection system 160.

An additional advantage is the inherent ability to measure temperature along the water column. When imaging components of a reactor 106, including the nuclear reactor core 140 itself, the water column temperature has a strong temperature gradient. The fuel assemblies 124 are hot and the water 144 is the coolant, therefore the water close to the fuel assemblies 124 is much hotter than the water further away. This is evident by the presence of thermals in the water 144 near the fuel assemblies 124. These thermals (refractive turbulence) cause distortions in any optical image of the fuel assemblies 124 and are clearly visible in camera images along with 3D images produced by the lidar 400 of the inspection system 160. Accurate knowledge of the index of refraction of the water is critical for accurate reconstruction of any 3D information. The index of refraction is known to change with wavelength, temperature, salinity, and pressure. A change in index will change the time it takes a pulse to travel to the target and back, and also changes the path of travel (angle) of the beam. With range-gated knowledge of temperature along the beam path, adjustments for differences in the refractive index can be made, allowing the 3D image to be more accurately reconstructed.

As can be appreciated by one of skill in the art after consideration of the present disclosure, the basic components of the lidar system 400 are the light source 404 and the primary receiver 444. Embodiments of the present disclosure can include all of the components illustrated in FIGS. 4A through 4H, additional or alternate components, or a subset of these components. In accordance with embodiments of the present disclosure, the range and angle measurements should all be compensated using techniques described in U.S. Pat. Nos. 8,184,276 and 8,467,044. The memory 464 can be used for storing the location information, operating instructions, generated data, and the like. An input/output or communication interface 468 can be included for transmitting determined information to a monitoring and control station 504 (see FIG. 5) or other system or control center in real-time, near real-time, or asynchronously. A power source and distribution bus 472 can also be integrated with the inspection system 160. Various elements of an inspection system 160 as disclosed herein can be provided as or by discrete or integrated components. For example, the various receivers 444, 456, and 460 can be implemented as photo-sensitive detectors formed in the same semiconductor substrate. Moreover, optical elements, such as beam splitters 440, 450, and/or 452, narrow band filters 454, 458, and focusing lenses 474, 476 can be formed on a substrate that is bonded, soldered, or otherwise attached to the semiconductor substrate in which the photo-sensitive detectors are formed, creating an integrated chip or package. In another embodiment, optical paths within the optical head 308 can be either free space paths, paths within an optical fiber and fiber optic components, or a combination of both.

Figure 5:
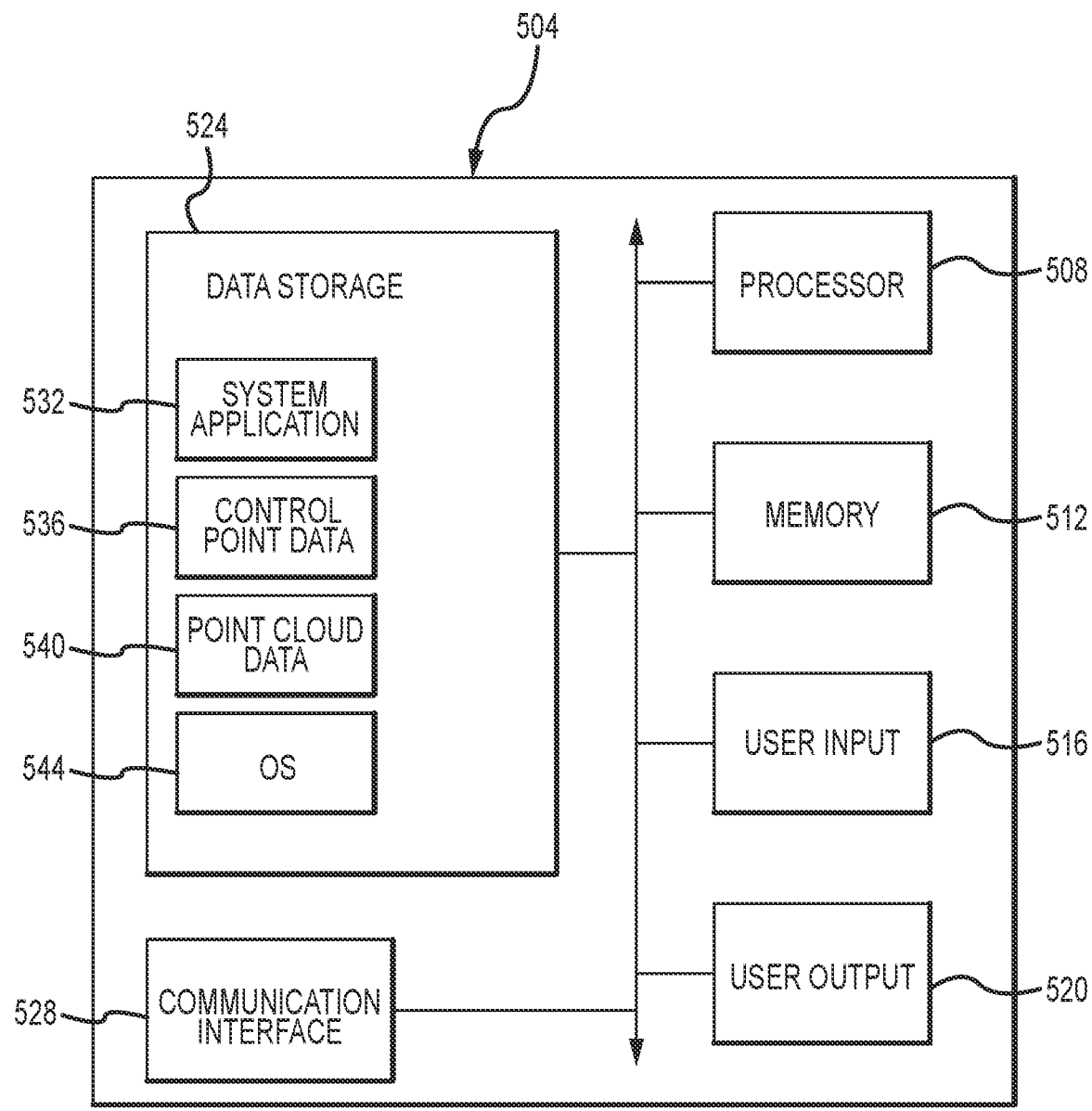
FIG. 5 depicts components of a monitoring and control station provided as part of a monitoring system in accordance with embodiments of the present disclosure.

FIG. 5 is a block diagram depicting human interface and other components included in a monitoring and control station 504 that can be provided as part of or in conjunction with an underwater inspection system 160 in accordance with embodiments of the present disclosure. For instance, the monitoring and control station 504 can be provided as part of a control box 304 portion of an inspection system 160. As another example, the monitoring and control station 504 can be provided as part of a standalone computer, such as a standard desktop or laptop computer, in communication with the monitoring system 160 through the communications interface 468a. The monitoring and control station 504 facilitates or performs functions that include providing output to and receiving input from a user or from an automated processing center. The monitoring and control station 504 generally includes a processor 508 and memory 512. In addition, the monitoring and control station 504 can include one or more user input devices 516 and one or more user output devices 520. The monitoring and control station 504 also generally includes data storage 524. In addition, a communication interface 528 can be provided, to support interconnection of the monitoring and control station 504 to the inspection system 160, and/or to other systems. More particularly, the communication interface 528 of the control station 504 can support wireless or wireline communications with the communication interface 468a of the inspection system 160. Point cloud data from the lidar 400 of the inspection system 160 can be provided by the user output 520, for instance as an image provided in real time or near real time to an operator. An operator can thus provide real time or near real time control input, for example through the user input 516 of the control station 504, or through separate controls or inputs, to control operation of a mast 168, the bridge assembly 152, the pan and tilt head 328, the lidar system 400 of the inspection system 160, or other equipment. The output provided to the operator can also be used to determine where to position the monitoring system 160, and in particular the optical head 308, relative to a reactor pressure vessel 108 or other components or structures, such that the field of view 168 of the inspection system 160 encompasses a desired area of or near the reactor pressure vessel 108 or other components or structures. This interface can also be used as a command and control interface 504 to another autonomous device that provides the inputs and reads outputs that replaces human user interfaces 516 and 520.

The processor 508 may include a general purpose programmable processor or any other processor capable of performing or executing instructions encoded in software or firmware. In accordance with other embodiments of the present disclosure, the processor 508 may comprise a microprocessor, micro-controller, FPGA, or ASIC capable of performing instructions encoded in logic circuits. The memory 512 may be used to store programs and/or data, for example in connection with the execution of code or instructions by the processor 508. As examples, the memory 512 may comprise RAM, SDRAM, or other solid-state memory. In general, a user input device 516 is included as part of the monitoring and control station 504 that allows a user to input commands, including commands that are transmitted to the inspection system 160, to control that system. Examples of user input devices 516 that can be provided as part of the monitoring and control station 504 include a keyboard, keypad, microphone, biometric input device, touch screen, joy stick, mouse, or other position encoding device, or the like. Input can also be provided through a series of commands through communications interface 528 using custom or standard protocols such as Ethernet, UDP TCP, RS232, I2C or other standard protocol. A user output device 520 can, for example, include a display, speaker, indicator lamp, or the like. Moreover, a user input device 516 and a user output device 520 can be integrated, for example through a graphical user interface with a pointing device controlled cursor or a touchscreen display. Like the memory 512, the data storage 524 may comprise a solid-state device. Alternatively or in addition, the data storage 524 may comprise, but is not limited to, a hard disk drive, a tape drive, or other addressable storage device or set of devices. Moreover, the data storage 524 can be provided as an integral component of the monitoring and control station 504, or as an interconnected data storage device or system.

The data storage 524 may provide storage for a underwater monitoring system application 532 that operates to present a graphical user interface through the user output device 520, and that presents point cloud data, or data derived from point cloud data, obtained by one or more underwater monitoring systems 304. The application 532 can further operate to receive control commands from a user through the user input device 516, including commands selecting targets or other control points on components or structures within a reactor vessel 108, or other underwater structure.

In accordance with embodiments of the present disclosure, the application 532 can perform various functions autonomously, such as identifying underwater structures, identifying features on structures to be inspected, identifying a centroid of a structure or a feature of a structure, identifying control points on structures, identifying target centroids, monitoring the motion, vibration, and/or temperature parameters of structures, measuring gaps between fuel assemblies, locating foreign objects, locating baffle bolts, or other operations. Such automated operations can be implemented using, for example, image recognition techniques. The data storage 524 can additionally provide storage for the selected control points 536, for point cloud data 540 generated by operation of one or more inspection systems 160, and for range, vibration, vibration mode, temperature, leak detection, or other measurements or data generated by an inspection system 160. In accordance with still other embodiments of the present disclosure, the system application 532 can be executed to detect motion, vibration, vibration mode, temperature, changes, features, lack of features, foreign objects, gaps, other anomalies, or leaks instead of or in conjunction with execution of the system software 463 by the processor 448 of the inspection system 160. The data storage 524 can also store operating system software 544, and other applications or data.

Embodiments of the present disclosure can further provide methods and devices for vibration measurements of underwater structures, such as components of or associated with a reactor vessel 108, from one or more static or moving optical, laser, or lidar devices 400. The method is remote and non-contact providing the benefits of no tooling requirements or retrofits to old equipment. The standoff range is limited to the inspection system 160 itself; the range could be over 50 m for an underwater lidar. The inspection system 160 makes a rapid number of range measurements to the target at a particular location on the equipment. The timing of the range measurements is accurately recorded. Using the range and time measurements, vibration displacement (direct measurement) and frequency content (through a Fourier Transform or other calculation) can be calculated. A single spot sensor (such as a scanning lidar) can be programed to measure multiple locations in a fast succession in order to obtain vibration distance and frequency information at multiple locations on the structure in virtually the same time. This can then be used to calculate the vibration mode of a structure. Alternately, multiple single spots can be scanned. Alternately, a laser line scan system, triangulation sensor, structured light sensor, holographic sensor or flash lidar could be used to make range, angle, angle measurement on multiple points simultaneously. Alternately a coherent system that measures velocity directly through Doppler measurements can be used to make the vibration measurements. The range and angle measurements should all be compensated using techniques described in U.S. Pat. Nos. 8,184,276 and 8,467,044. Compensation for variations in the refractive index of the water can be made using temperature measurements taken by the lidar system 400 of the inspection system 160.

Figure 6:
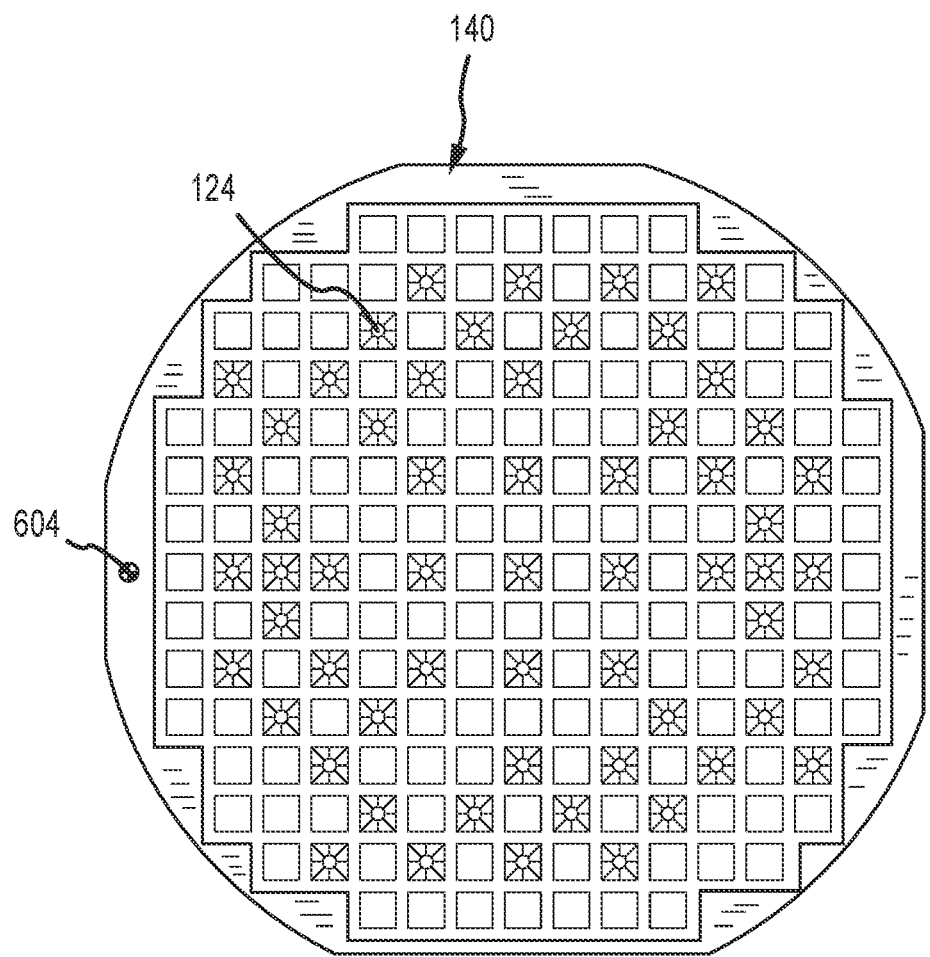
FIG. 6 is a replica of point cloud data obtained by a monitoring and inspection system in accordance with embodiments of the present disclosure.

FIG. 6 shows a replica of point cloud data obtained by an inspection system 160 in accordance with embodiments of the present disclosure, with the optical head 308 aligned such that the field of view 168 of the inspection system 160 is looking down into the interior of a nuclear reactor vessel 108. In particular, a view of the fuel assembly area 140 of the reactor core, at least partially loaded with fuel assemblies 124, is illustrated. As can be appreciated by one of skill in the art after consideration of the present disclosure, an inspection system 160 can measure the relative locations of components. These measurements can be relative to the inspection system 160, relative to other components or references (such as known bolt holes or other structural features), or relative to reference indicia or targets 604. For example, scribe marks, inked or painted lines, applied targets, three-dimensional targets, or other indicia can be placed at known locations within a nuclear reactor pressure vessel 108. The actual locations of components within the nuclear reactor pressure vessel 108 can then be determined relative to the references. Moreover, measurements of gaps between components, such as between fuel assemblies 124, can be made. Embodiments of a monitoring system as described herein are capable of making these measurements with high levels of accuracy. In accordance with embodiments of the present disclosure, gap measurements can be made by registering point cloud data of the fuel assemblies 124 with solid models or simplified geometric representations of the fuel assemblies 124. Gaps can also be validated by scanning the core 140 to obtain 3D point cloud data, and comparing that data to a reference scan, 3D model, or as-built model of the reactor core 140 internals. Moreover, a scan or scans of fuel assemblies 124 can be used in a virtual assembly or model to detect actual or potential misalignments. As can be appreciated by one skill in the art after consideration of the present disclosure, some or all of the inspection system 160 components can be moved, to alter the field of view 168 of the inspection system 160, to obtain point cloud data from selected areas within or surrounding the reactor 106. For example, the pan and tilt head 328 can be operated to point the optical head 308 such that the field of view 168 encompasses the inlet 116, outlet 132, the lower core plate 120, all, some or selected ones of the fuel assemblies 124, or selected areas of the interior of the reactor pressure vessel 108. In addition, embodiments of the present disclosure can operate to determine the condition of components. For instance, bows, bends, twists, or other anomalies in a fuel assembly 124 can be detected and measured using 3D data obtained by the inspection system 160. As still another example, identifiers such as an identification number can be read from fuel assemblies 124 or other components. As yet another example, an inspection system 160 can detect foreign objects or other anomalies from point cloud data collected by the included lidar system 400.

Figure 7:
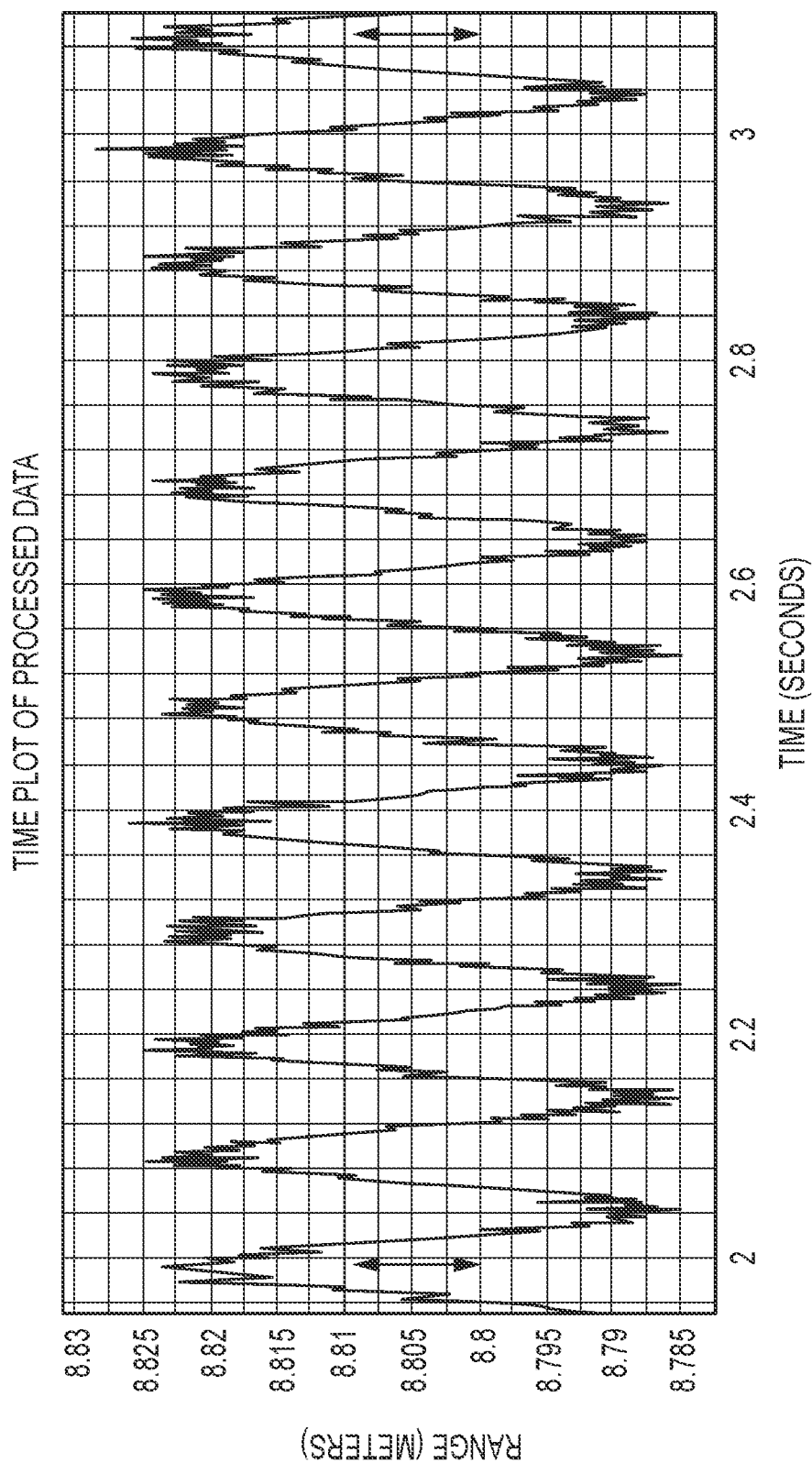
FIG. 7 depicts exemplary vibration data obtained by a monitoring and inspection system in accordance with embodiments of the present disclosure.
Figure 8:
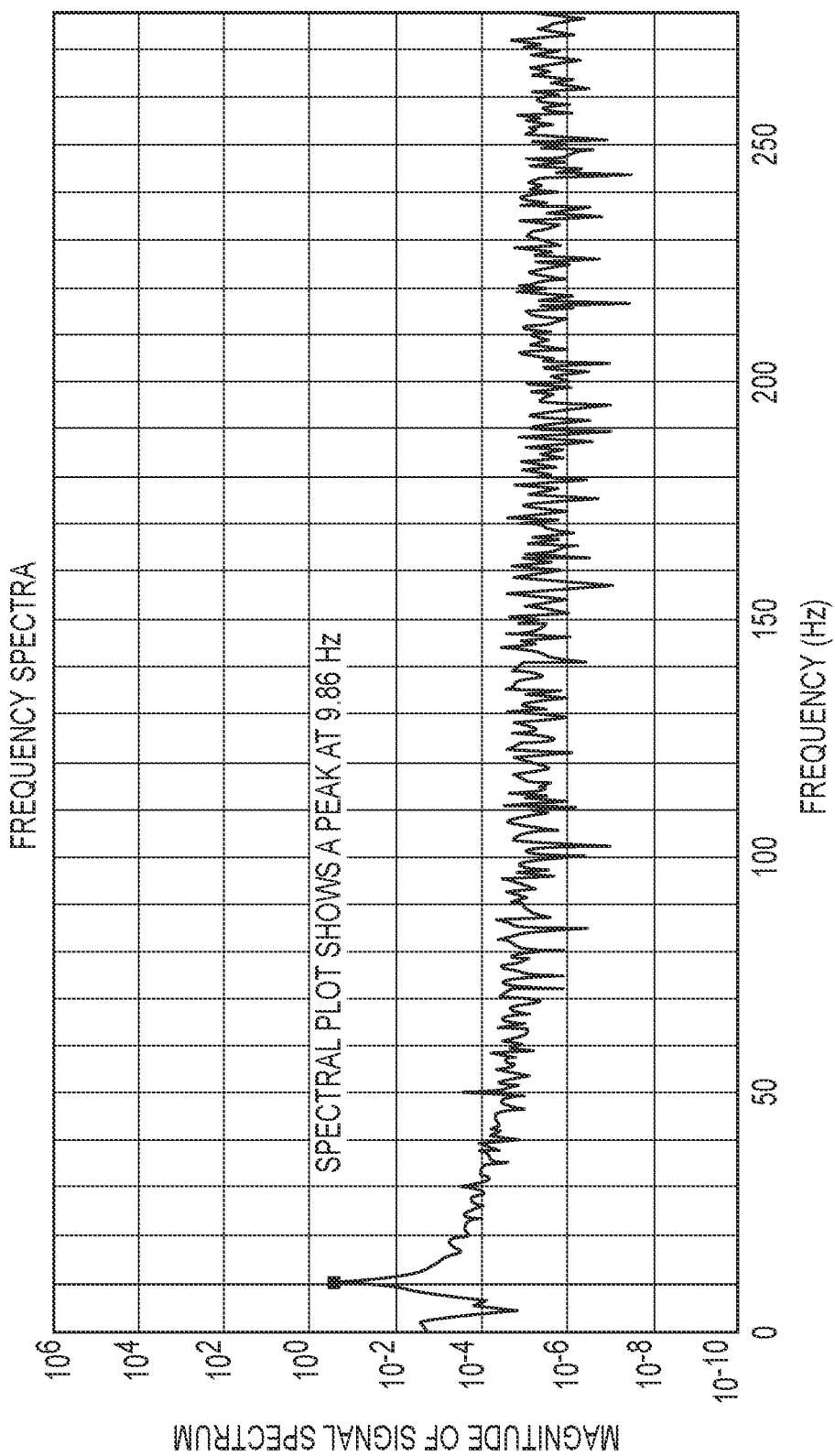
FIG. 8 depicts a Fourier transform of vibration data obtained by a monitoring and inspection system in accordance with embodiments of the present disclosure.

In accordance with embodiments of the present disclosure, a lidar system 400 included as part of an inspection system 160 can be operated to provide vibration data of a component or structure within the field of view 168 of the inspection system 160. FIG. 7 shows an example output of an underwater lidar, such as may be included in an inspection system 160 as disclosed herein, at 8.8 m standoff range from a target also in water. In this example, the target was vibrating at 10 Hz with a designed 3 cm of displacement. The x-axis is the accurately measured time and the y-axis is the range measured by the lidar system 400. The plot shows the range can easily be measured to less than +/−5 mm. A simple count of the number of cycles shows there are close to 10 cycles in 1 second (10 Hz). Alternately, the power spectrum of the signal can be viewed by performing a Fourier Transform on the signal. This is shown in FIG. 8. The signal spectrum clearly shows a peak close to 10 Hz (9.86 Hz). Accordingly, embodiments of the present disclosure provide an inspection system 160 that can measure the vibration frequency and amplitude of an underwater component or structure, without requiring contact with that component or structure.

Embodiments of the present disclosure provide various advantage over other methods for vibration sensing include enabling non-touch measurements, reduced radiation exposure and reduced tooling. Multiple devices can be used from different orientations to capture motion in all directions as opposed to just along a single line of sight. The positions and orientations of components can be acquired in real time, to ensure that the components are free of defects and are assembled correctly. Using the LiDAR reduces the installation time of clamped tooling, eliminates the design and fabrication of custom gauges to make measurements, and underwater logged data recovery along with the risk of touching the underwater structures. An inspection system 160 as disclosed herein also enables measuring movement and displacement in X, Y, Z planes, including angular tilts. An underwater optical, laser, or lidar device is used to measure displacement or movement of the structure at a standoff distance with no contact of the actual structure itself. The method is remote and non-contact providing the benefits of no tooling requirements or retrofits to old equipment. The standoff range is limited to the device itself, which could be over 50 m for an underwater Lidar. The device makes a rapid number of range and angle measurements to the target. Alternately, multiple single spots can be scanned. Alternately, a triangulation sensor, a laser line scan system, structured light sensor, a holographic sensor, or flash lidar, or any combination of these could be used to make range, angle, angle measurement on multiple points simultaneously. The range and angles measurements should all be compensated using techniques described in U.S. Pat. Nos. 8,184,276 and 8,467,044. Multiple devices can be used from different orientations to capture motion in all directions as opposed to just along a single line of sight.

In addition or as an alternative to a lidar system 400, an inspection system 160 can include devices wherein the range, angle, or imaging measurement is made by a method selected from the group consisting of: flash lidar, laser scanning, laser triangulation, photometric stereo, stereoscopic vision, structured light, photoclinometry, stereo-photoclinometry, holographic systems, AMCW phase detection, chirped AMCW, amplitude FMCW, true FMCW, pulse modulation codes, time of flight pulse detection, and any combination of these, and wherein the angle or imaging measurement is made by a device comprising elements selected from the group consisting of scanning systems, a multi-detector system or camera (2D or 3D) where each detector pixel equates to an angle, and any combination of these. The step of making a range, angle or imaging measurement can include measuring a voltage, time, frequency, phase, number of samples, number of digits, encoder, pixel count, or fringe count. In addition, making a range, angle or imaging measurement can comprise scaling or adjusting a measured voltage, time, frequency, phase, number of samples, number of digits, encoder, pixel count, or fringe count by the measured or calculated index of refraction of the medium.

Embodiments of the present disclosure can include methods and devices that use known reference points in the vessel, cavity, or pool to confirm if a structure has moved in relation to the reference point. The reference point can also be used for location tracking of an object within the vessel, cavity, or pool in relative coordinates to the reference point.

During a refuel operation the fuel assemblies 124 of a nuclear reactor core 140 are all removed and then replaced at a later time. The gaps between fuel assemblies 124 are now different and must be validated to verify they are in a location that will align with the alignment features (either pins or holes) on the upper internals. Requirements usually dictate that the gap is less than 1 cm. Currently technology and methods normally validate the gaps using a pole mounted video camera. The camera is only a few feet above the tops of the fuel assemblies, and therefore is exposed to high radiation and has a small FOV of only a few feet at most. An operator moves the camera using the pole that is sticking out of the water. Inspectors watch the video feed and use screen calipers to estimate the gaps. There are several issues with this approach. Screen calipers must be calibrated to a known feature in the scene and then held at that same distance for the calibration to hold true. This is difficult with manual moving of the pole. Lighting can cause bright reflections and shadows which make features difficult to see and measure. A video stream of an entire core can last several hours, which means an inspector must scroll through hours of video data to find specific locations to check. This makes back referencing difficult.

An improved method is to use a long-range optical sensor, as provided by an inspection system 160 as described herein. The optical sensor includes a lidar system 400 having components that are mounted using a pole or bracket onto a bridge such as the refuel machine or an auxiliary bridge. Alternately it can be attached to a vehicle or floating platform. Ideally, the optical sensor can view the entire scene from a single location so no image registration is required. The optical sensor takes a series of range, angle, angle measurements to generate a 3D point cloud of the entire core. Since the optical sensor is making 3D measurements, calibrations similar to the camera method are not required. However, to make accurate measurements the index of refraction of the water must be taken into account, as or similar to as described in U.S. Pat. No. 8,184,276 or 8,467,044. If adjustments based on the index of refraction are not used, then calibrations must be performed using calibrated targets or features and these calibrations must continue to be performed as water conditions change.

The 3D point cloud can be visualized with color mapped to intensity or color mapped to range. Automated software is then used to measure the gaps. This can be done by measuring the gaps directly, or by measuring features on the fuel assemblies 124 directly and then measuring the distances between the features. The distance is known from one feature to the next when there is no gap, therefore this value can be subtracted from the calculated value to determine the actual gap. This can be automated in software to calculate hundreds of gaps automatically. The gap to the baffle wall is also needed. One method of performing this measurement is to turn the baffle wall into a surface and make measurements from features on the assemblies to the wall surface. Multiple features should be used on the fuel assemblies for redundant measurements.

In another embodiment a solid, wireframe, feature, or other model is created of the entire fuel assembly top nozzle or some portion of the fuel assembly top nozzle. The goal of this model is to contain key features (holes, pins, edges, springs, etc.) that exist on the top of the fuel assembly nozzle. This model or wire frame contains many features that are then compared to the point cloud. The model is registered or best fit to the point cloud by using multiple features and points in the point cloud as opposed to just pins or holes. A quality control (QC) check is performed to ensure the fit of the point cloud to the model achieves acceptable accuracy. Once this is performed, then the models, or simplified geometry of the models, can be used for feature-to-feature measurements or direct gap measurements as opposed to measuring from the point clouds. The same method can be used for the baffle walls. Another option is to not use the true 3D point cloud data but a projection of all or some portion of the 3D point cloud data onto a plane and then fit 2-D structures to the 2D point cloud. The software can then in tabular form or visual form provide the numerical value for every gap and color-code the values to highlight areas of concern. This way an inspector can at a glance determine if there is an area of concern. The optical sensor can quickly re-scan any areas of concern at higher resolution (if desired) to provide a closer look at any areas of interest/concern. The end result is a single point cloud file of the entire core that can be easily stored and provides a historical, measurable dataset for future reference. The single dataset can be viewed as a single entity where individual features are can be located in seconds, as opposed to multiple hours of video.

The optical scans and measurements taken by the inspection system 160 can be made of a fully populated core 140 or a partially populated core 140. Performing scans and measurements for gaps of a partially populated core 140 can performed while the reload operation is occurring, so no additional time is added to critical path time. In addition, issues (e.g., large gaps) can be identified early and corrected instead of waiting until the placement of the final fuel assemblies to identify issues that require significant rework to solve.

Note that the gap measurements are performed to ensure the fuel assemblies 124 and the upper internals mate together (pin and hole alignment features mate correctly). Another method to achieve this is to take the 3D scan of the core 140 and compare this with either a 3D scan of the upper internals, or a 3D model of the upper internals (as-built or as-designed). The two 3D models/point clouds can then be mated in CAD to determine if there are any clashes, interferences, or misalignments. The baffle walls or other features can be used as reference points for the global alignment of the two point clouds/models. At the same time as gap measurement data is collected, fuel assembly 124 serial number identifiers can also be captured for core mapping. These numbers are on the top of the fuel assemblies 124 and contain the unique identifier for each. With this data included in the single point cloud used for gap measurements, an inspector can view the core and validate each fuel assembly is in its proper location. Since the fuel assembly identifiers are all alpha-numeric characters and the list of IDs is known, automated software can be used to auto-find each serial number and perform the validation as opposed to using an operator. Automating serial number identifications validates nuclear inventory placement in the core in real time, eliminates the need for multiple inspectors and verifiers, removes human interpretation/error and allows quick reference and retrieval of stored data in the future.

Before the fuel assemblies 124 are replaced in the core 140, the lower core plate 120 is inspected for foreign objects, and any objects found are retrieved. This is called Foreign Object Search and Retrieval (FOSAR). Alternate technology and methods include using a pole mounted video camera and pole mounted underwater lights. The camera is only a few feet above the core plate, and therefore is exposed to radiation and has a small FOV of only a few feet at most while the area to be inspected is over 18 $m^2$. An operator moves the camera using the pole that is sticking out of the water. Inspectors watch the video feed to identify any foreign material. There are several issues with this approach. For example, this is difficult with manual moving of the pole. Lighting can cause bright reflections and shadows which make features difficult to see and identify. A video stream of an entire core plate inspection can last several hours, which means an inspector must scroll through hours of video data to find specific locations to check. Decisions are usually made by the technicians in the reactor area operating the equipment as opposed to subject matter experts. This makes back referencing difficult.

Embodiments of the present disclosure enable a single optical sensor or lidar 400 to be placed above the center of the core plate at 7 m range (for example). The optical sensor takes a series of range, angle, angle, intensity measurements to generate a 3D point cloud of the entire core plate. The entire lower core plate 120 is scanned from a single sensor location so registration is not required. A 3D point cloud of the core plate is generated from the scan. The 3D point cloud can be visualized with color mapped to intensity or color mapped to range. In one embodiment, an operator manually scans the core plate for foreign objects by looking for color changes or shapes in the data.

In a different embodiment, the bottom surface of the core plate is fit to a plane and colorized as a single object. This can be done manually or with automated software. Objects that are above the surface of the core plate are colorized a different color to highlight objects above the surface. This can be performed in at least two steps, one to capture small objects on the surface and another to capture objects sticking out of the instrument ports as these two areas of interest are up to 0.5 m apart in height and therefore doing both on the same colormap will hide objects of interest.

An advantage of embodiments of the present disclosure is the ability to "zoom" to any area of interest within the FOV 168 from the single sensor location. This allows for quickly performing a high resolution or zoom of an area of interest without moving the sensor. Therefore, once the initial scan is performed and processed, any area of interest can be identified. Since the location is known in 3D space, a high-resolution scan can be performed of that area alone, aiding in FOSAR activities.

In another embodiment the 3D point cloud of the core plate 120 is compared to a previous point cloud and differences auto-highlighted. In this scenario the comparison can be performed on point clouds, models generated from the point clouds, or both. This operation can be performed manually or automatically.

The lidar system 400 can be operated to determine the correct location for a component or assembly. The light source 404 of the lidar system 400 can also be operated to provide a pointer or other visual indication to assist an operator in placing a component or assembly in the correct location. In another embodiment the 3D sensor or lidar system 400 can be used to visually identify any foreign objects that must be retrieved to the retrieval operators. Once a foreign object is located within the point cloud its location is known in X,Y,Z space in relation to the sensor or other areas of the core plate. The laser can then be pointed to the correct location in X,Y,Z space and the laser can be used as a visual indicator or "pointer" to where the foreign object is located thus clearly guiding the operator of the retrieval equipment to the correct location.

The end result of the 3D data obtained by the inspection system 160 is a single point cloud file of the entire core plate 120 that can be easily stored and provides a historical, measurable dataset for future reference. The single dataset can be viewed as a single entity where individual features are can be located in seconds, as opposed to multiple hours of video. The single dataset can now be immediately sent out of the Reactor Containment Building (RCB) and reviewed by multiple stakeholders for Quality Control or inspection instead of one or two individuals in the RCB thus significantly minimizing error and greatly reducing time to retrieve video data from the recording location.

Prior systems and methods for reactor vessel 108 FOSAR are performed with a pole mounted video camera and pole mounted underwater lights. The camera is a few feet above the vessel bottom, and therefore is exposed to radiation and has a small FOV of only a few feet at most while the area to be inspected is over 400 ft². Technically the camera is positioned several feet from the bottom of the vessel, thus requiring the focal view of the camera to be drastically reduced due to zooming the camera to a small area. It is difficult to ensure that 100% of the vessel bottom is surveyed. It is common to skip areas and not have good enough resolution to see small objects the size of paper clips and quarter inch washers. An operator moves the camera using the pole that is sticking out of the water. Inspectors watch the video feed to identify any foreign material.

There are several issues with this prior approach. This is difficult with manual moving of the pole. Lighting can cause bright reflections and shadows which make features difficult to see and identify. A video stream of an entire vessel inspection can last several hours, which means an inspector must scroll through hours of video data to find specific locations to check. Decisions are usually made by the technicians in the reactor area operating the equipment as opposed to subject matter experts. This makes back referencing difficult.

Alternatively, in accordance with embodiments of the present disclosure, a single optical sensor can be placed above the center of the vessel at a 15 m range (for example). The optical sensor takes a series of range, angle, angle, intensity measurements to generate a 3D point cloud of the entire vessel. The entire vessel is scanned from a single sensor location so registration is not required. A 3D point cloud of the vessel is generated from the scan. The 3D point cloud can be visualized with color mapped to intensity or color mapped to range. In one embodiment, an operator manually scans the vessel for foreign objects by looking for color changes or shapes in the data.

In a different embodiment of the present disclosure, the bottom surface of the reactor pressure vessel 108 is fit to a modeled surface and colorized as a single object. This can be done manually or with automated software. Objects that are above the surface of the reactor pressure vessel 108 are colorized a different color to highlight objects above the surface. This can be performed in at least two steps, one to capture small objects on the surface and another to capture objects sticking out of the instrument ports as these two areas of interest are up to 20 inches apart in height and therefore doing both on the same colormap will hide objects of interest.

An advantage of the invention is the ability to "zoom" to any area of interest within the field of view (FOV) 168 from the single sensor location. This allows for quickly performing a high resolution or zoom of an area of interest without moving the sensor. Therefore, once the initial scan is performed and processed, any area of interest can be identified. Since the location is known in 3D space, a high-resolution scan can be performed of that area alone, aiding in FOSAR activities.

In another embodiment of the present disclosure, the 3D point cloud of the vessel is compared to a previous point cloud and differences auto-highlighted. In this scenario the comparison can be performed on point clouds, models generated from the point clouds, or both. This operation can be performed manually or automatically.

In still another embodiment of the present disclosure, the 3D sensor can be used to visually identify any foreign objects that must be retrieved to the retrieval operators. Once a foreign object is located within the point cloud its location is known in X,Y,Z space in relation to the sensor or other areas of the vessel. The laser can then be pointed to the correct location in X,Y,Z space and the laser can be used as a visual indicator or "pointer" to where the foreign object is located thus clearly guiding the operator of the retrieval equipment to the correct location.

The end result is a single point cloud file of the entire vessel that can be easily stored and provides a historical, measurable dataset for future reference. The single dataset can be viewed as a single entity where individual features are can be located in seconds, as opposed to multiple hours of video. The single dataset can now be immediately sent out of the Reactor Containment Building (RCB) and reviewed by multiple stakeholders for Quality Control or inspection instead of one or two individuals in the RCB thus significantly minimizing error and greatly reducing time to retrieve video data from the recording location.

Baffle bolts have recently been found to degrade, come loose, or fall off causing additional metal foreign material in the reactor pressure vessel 108 setting. Inspections for baffle bolts typically are the same as for other FOSAR activities—close range cameras are used for inspections that require "calibrations" and then must be held at that same distance and focus. An improved method is to use an optical inspection and measurement device 160 as described herein. The device 160 optical head 308 is lowered into the core cavity and scans all the baffle walls. This can be accomplished by a number of methods.

In the instance where the FOV 168 of the optical system is limited (like a camera or for instance 30°×30°) "snap shots" of the baffle walls are taken and then the optical system is moved via a pan/tilt to capture the next area. Because the optical system is in a single location the scenes do not have to be registered but can be stitched together using the angles of location from the pan/tilt device 328. Another configuration is for the optical system to have a FOV 168 that covers the entire height of the baffle assembly. For instance, if the baffle walls are 5 m high and the optical system is in the center of the core cavity and is 2 m from the baffle walls, then the FOV must be approximately 95°. Therefore, an optical system that scans a vertical line with at least a 95° vertical FOV would capture the entire height in a single scan. This individual scan line can then be rotated 360° via mirrors or a pan motor to enable a capture of the entire core cavity from a single sensor location.

While going through the heating and cooling cycles within a reactor 106, fuel assemblies 124 can experience bends, twists, and bows. These deformations can cause issues during reload (such as out-of-spec gaps) that can waste critical path time. Previous methods and technology use close-up camera inspections to assess the condition of fuel assemblies during a reload cycle, however long bends and twists are close to impossible to detect using a single camera. Embodiments of the present disclosure provide an improved method to detect and measure bends, twists, bows, and deformations in fuels assemblies and spacer grids is desired.

In particular, embodiments of the present disclosure provide an inspection system 160 that can be used that inspects the fuel assemblies 124 while moving through the transfer canal, or while stored in the Fuel Storage Building (FSB) or during some other time/location as desired. In at least some embodiments the fuel assembly 124 is lowered into a mount structure to hold the assembly vertical and keep it from swaying (as it would when held by a crane alone). This could be as simple as a plate with guide pins. In one embodiment the optical sensor of the inspection system 160 scans the entire length of the fuel assembly 124. In another embodiment the inspection system 160 scans only a few cross sections along the length of the fuel assembly 124 to capture deformities such as bow and twist. Multiple optical heads 308 can be deployed simultaneously to capture two corners or four sides of the fuel assemblies 124. Alternatively, a single optical head 308 can be moved around the fuel assembly 124. As yet another alternative, the fuel assembly 124 could be lowered onto a mount structure that rotates so all sides can be viewed by a single stationary inspection system. Another option is to use a series of mirrors around the fuel assembly 124 so the entire assembly 124 can be seen from a single sensor head 308 location. However, a bow or twist would affect all sides therefore those deformations should be detectible from a single side or corner scan.

In another embodiment the fuel assembly 124 can be left hanging from the crane, however some swaying will occur. This motion can be compensated by taking data at a very fast rate, much faster than the rate of motion. Another option is to track the motion of the fuel assembly 124 and apply a correction to the 3D data based upon the movement. This is currently performed subsea using inertia navigation systems. While this could be achieved by placing an inertia navigation system on the fuel assembly 124, an alternative approach is to track the motion of the fuel assembly 124 using another optical system. This could be 2D or 3D and using any number of technologies such as LiDAR, structured light, triangulation, photometric stereo, or stereo imaging.

During most refuel outages the lower internals are not removed, therefore visibility and access below the core plate is limited by the flow holes in the core plate 120 which are around 7 cm diameter (for example). If any foreign objects are dropped down these holes (or believed to be present in the holes) then small articulating cameras attached to large mechanical devices are lowered for inspection. These cameras have extremely limited fields of view. It would be advantageous to have a better way to see into the flow holes and beneath the core plate.

Embodiments of the present disclosure provide an inspection system 160 with an underwater lidar system 400 that can see through the flow holes where there is a direct line of sight. One method to obtain partial coverage below the flow hole is to keep the optical sensor above the core plate but pan and tilt the optical head 308 at different angles and move to different locations over the core plate. This produces more angles of entry into the flow holes for the laser beam and therefore provides better coverage, however it is still limited.

Better coverage can be provided by a system configured to fit through the flow hole itself. One example is where an optical head or a portion of an optical head 308 fits through the 7 cm flow hole with a hemispherical window 428. A spinning mirror collects data from approximately 180° swath (looking down). Ideally the only components of the optical head 308 are the hemispherical window 428, spinning mirror 424, and a single fiber optical cable 492 that delivers the transmit laser and collects the return signal. In another embodiment the window is cylindrical to allow for a larger field of view. Alternately there could be two fiber optics 492 for transmit and receive. Alternately the laser head or light source 404 or the receiver head 444 could be within the small optical head 308. In at least some embodiments, a lower optical head portion 308b is configured to extend through flow holes or other apertures in the core plate 120. Above the core plate 120 an upper portion 308b of the optical head is attached to a pan unit 484 with a high accuracy encoder. The pan unit 484 rotates the lower portion 308b of the optical head 308 so a full hemisphere of data is collected from a single location. The high accuracy pan unit 484 encoder along with the spinning mirror 424 positions are used to gain angle/angle information to rebuild the point cloud. This configuration keeps a small optical head 308b for fitting within the flow holes and the remaining part of the optical head 308a above the flow holes. A tether 332 still attaches the optical head 308 components to the electronics in the topside enclosure 304.

High resolution inspections are required for pressure retaining structures and components in the reactor cavity and vessel. Welds, bolting, pump casing interiors, valve body interiors, interior attachments to the reactor vessel, reactor vessel interior, reactor vessel removable core support structures and reactor pressure vessel component external surfaces require inspection for cracks, degradation and deformities. Traditional technology and methods use "calibrated cameras". To calibrate a camera, an object of known dimensions is lowered to the object under inspection. The camera is then lowered by pole (usually over 10 m of pole) and focused until the object can be identified (usually text that is readable). At this point, the camera is considered "calibrated" at that discrete distance from the object being viewed and the unaltered area lighting. The focus, distance from object, angle from object, and lighting must remain fixed for additional inspections. An operator must then move the pole mounted camera by walking around the reactor and not changing any of the parameters used to calibrate the camera. Once any one of the parameters have been changed (lighting, distance, focus), then the camera has to be calibrated once again before continuing with visual inspection. As the camera is close to the object the FOV is small (only a few square feet), therefore a large amount of time is required to inspect large areas (hundreds of square feet). The data stored or archived during inspection is limited to only the intended area to be evaluated.

Alternatively, a single optical head 308 provided as part of an inspection system 160 in accordance with embodiments of the present disclosure can be placed above the center of the inspection area at a 5 m range (for example). The optical sensor takes a series of range, angle, angle, intensity measurements to generate a 3D point cloud of the area. The entire area is scanned from a single sensor location so registration is not required in post-processing. When the optical head 308 is mounted on a calibrated pan or pan/tilt unit 328, the sensor can be moved with the pan/tilt and the angular position readout from the pan/tilt is used to combine the different scans together without the use of registration in post processing. Or alternately the area is scanned from multiple sensor locations and point clouds are registered in post-processing.

A 3-D point cloud of the object is generated from the scan. The 3D point cloud can be visualized with color mapped to intensity or color mapped to range. In one embodiment, an operator manually scans the object for defects by looking for color changes or shapes in the data. The data captured can be zoomed in at areas of interest to provide clearer more precise determinations of the observed object's condition. New scans can be performed of areas of interest at higher resolutions. The single dataset can now be immediately sent out of the RCB or FSB and reviewed by multiple stakeholders for Quality Control or inspection instead of one or two individuals in the Contaminate Area, thus significantly minimizing error and greatly reducing time to retrieve video data from the recording location In another embodiment the 3D point cloud of the object is compared to a previous point cloud and differences auto-highlighted. In this scenario the comparison can be performed on point clouds, models generated from the point clouds, or both. This operation can be performed manually or automatically. Not only is the area of intended inspection captured but all other surrounding areas as well. This allows for new areas of interest requiring evaluations in the future to be easily referenced or trended to past data already archived. This greatly reduces the need to perform future in-the-field inspections because the data was already archived during past scans of the entire viewing area. This eliminates the cost of mobilizing new equipment for inspections, many hours of video data mining and reduces radiological dose to workers.

When performing refuel and other operations, exact coordinate locations at the bottom of the vessel are difficult to understand and obtain. There is usually a main bridge above the pool that moves in two dimensions (X and Y) based upon encoders or tape markers, and then a tool (such as the main mast) that lowers down into the pool. The depth is sometimes known with encoders, sometimes not. However, when placing fuel back in the reactor the location for placement is needed to be known within ~1 cm. A better method for tracking location underwater is beneficial.

One method is to use an inspection system 160 as disclosed herein as a tracking device. In this embodiment the lidar 400 is located to the side and monitors the moving structure. Ideally targets are placed on the moving structure (the mast 148) and some global locations in the pool 104. Alternately features on the mast or the pool can be used as the targets, such as bolt hole patterns. The inspection system 160 takes a 3D scan of the moving object along with the global reference/target in the pool and can then calculate the location and orientation of the moving object in reference to the global reference in the pool. Consecutive 3D scans are performed where the control points are monitored in 3D space to locate the moving object. Using the global references, 3D scans of the pool, or reference drawings, a 3D map of the pool can be created with coordinates all referenced to the global reference markers in the pool. Therefore, if the moving object is located in reference to the global reference its location to all other features in the pool are now known. This information can be used to manually or autonomously guide the moving target to its desired location. Alternately, this method could be used solely to validate the final position, orientation and touchdown speed of the moving target once it believes it is at the desired location and report how much these vary from the ideal location. This can be used when placing fuel back on the core plate for validation of location. This approach does not require accurate placement of the optical system as it is determining the location of the moving object to a global reference so the optical system's exact location is not critical. By not mounting it on the mast the size, weight, and power are not as critical and it allows the mast to continue unhindered with its normal operations.

Alternately, the inspection system 160 could be mounted on the mast 148 and the inspection system 160 performs 3D scans of the global references to determine its location with respect to the global reference. This information can be sent back to a control computer to accurately identify the location of the mast. Alternately, the inspection system 160 can be mounted on the refuel machine and the optical system performs 3D scans of the global references to determine its location with respect to the global reference. This information can be sent back to a control computer to identify the location of the refuel machine.

These implementations can provide for an autonomous refuel system where the refuel machine and mast 148 are autonomously guided by the inspection system 160, or a combination of a topside tracking system and the inspection system 160. The inspection system 160 can accurately guide the mast to the transfer assembly to acquire or deposit fuel, and then guide the mast back to a particular fuel assembly 124 location in the core map to accurately place or acquire the next fuel assembly. The accurate underwater optical tracking and placement enabled by inspection systems 160 as disclosed herein is key for the realization of an autonomous system. The automation of any and all of these activities can greatly reduce the number of personnel required in the RCB or FSB, which reduces costs and more importantly reduces personnel risk and the amount of radioactive dose personnel receive.

While embodiments of the inspection system 160 disclosed herein are particularly helpful for refuel operations, it can be helpful for any operation where an object, mast, or tool must be accurately placed within the pool 104. For instance, when placing the upper internals or the core barrel back in place this same system can be used. In one instance the 3D scans can be of the moving object (upper internals, core barrel, etc.) and the target location (alignment pins, etc). In another embodiment the moving object is tracked compared to the global references and then the map of the pool is used to calculate current location vs desired location on the map. This tracking can be performed using a single inspection system 160 optical head 308, or multiple inspection systems 160 and/or optical heads 308, to perform the tracking. For example, multiple complete inspection systems 160 or an inspection system 160 in which one electronics control box 304 controls multiple optical heads 308 can be utilized. This application can also include both topside and underwater tracking and control. In this example a topside optical tracking system (such as a Total Station) could be used to track a control point on the moving bridge to provide an initial reference location that is fed to the underwater system for final accurate location identification. In all these instances the current location vs desired location can be output in multiple manners as described below from U.S. Patent Application No. 2019/0011565 A1 and U.S. Pat. No. 10,871,567.

In another embodiment the optical system can be used as a pointer to project an optical pattern or spot at the desired location as a guide to an operator for placement of equipment, fuel assembly, or for the location of a foreign object to be retrieved.

Figure 9:
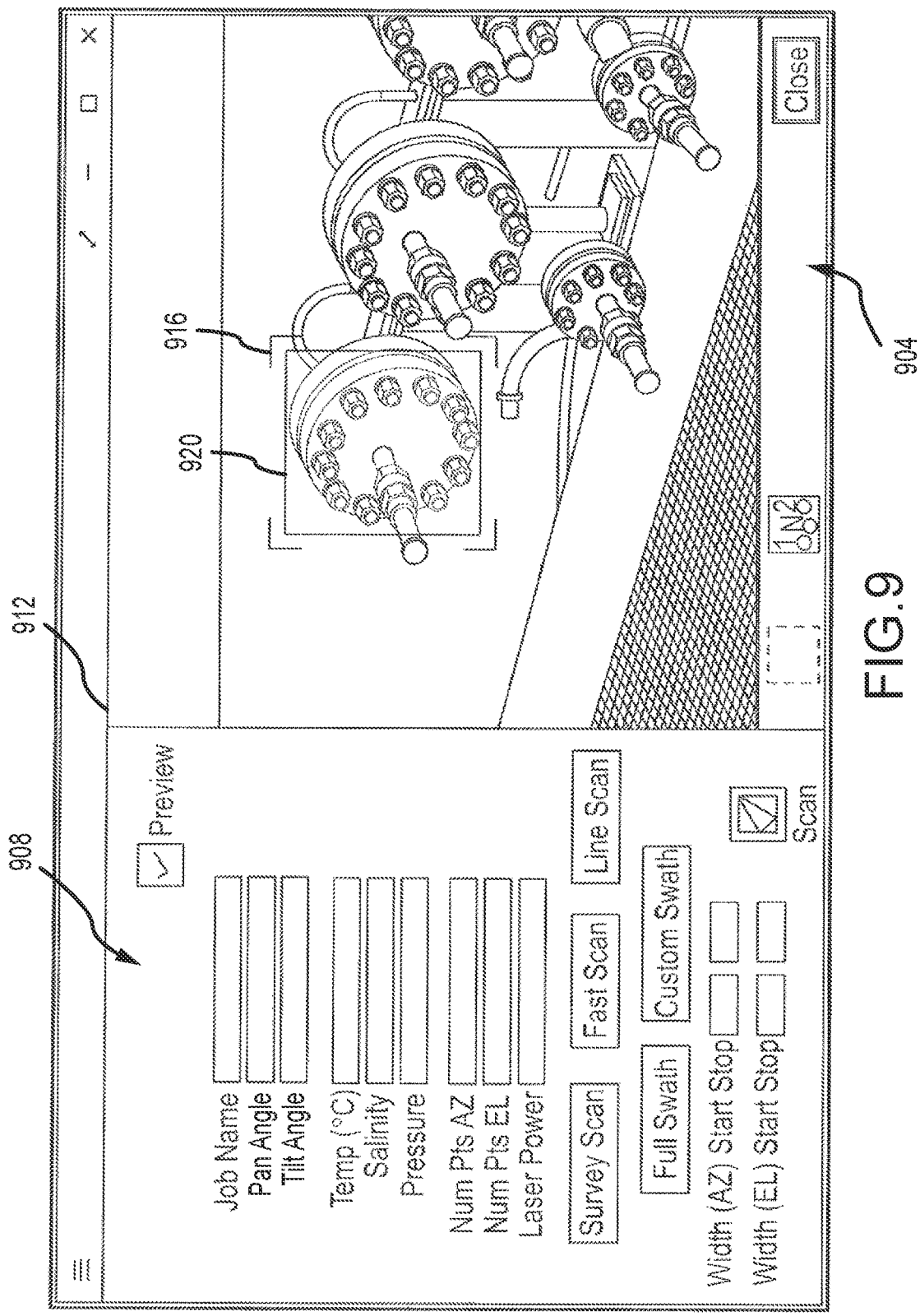
FIG. 9 depicts a user interface presented in connection with the operation of a monitoring and inspection system in accordance with embodiments of the present disclosure.

An example of a user interface 904 presented to a user by a user output device 520 of a control system 504 associated with an inspection system 160 in accordance with embodiments of the present disclosure is depicted in FIG. 9. As shown, the user interface 904 can include a user input section 908 containing a variety of data entry fields and virtual buttons that can be utilized by a user to enter control instructions or data through manipulation of one or more user input devices 516. The user interface 904 can additionally present an image 912 of the underwater scene generated from the point cloud data obtained by the initial scan of the scene. The image 912 can include point cloud data obtained from a single inspection system 160, or that has been stitched together from inspection systems 160 and/or optical heads 308. The image 912 could also be a subset or derivative of the point cloud data, such as just the intensity information, or a 2-D image. In addition, the image 912 can include a depiction or a 2-D image, such as a video image. Accordingly, the user interface 904 in cooperation with a camera can comprise a video system. In accordance with at least some embodiments of the present disclosure, the location of a target area 916 and a projected target 920 can be modified by the user through the user input devices 516. For example, the pan and tilt head 328 can be moved to direct the field of view 168 of the inspection system 160 as desired by the operator. Moreover, in accordance with at least some embodiments a projected target 920, which can include visible light produced by the light source 404, can be projected onto a structure or area by the transmit and receive optics 420. The establishment of a target area 916 can involve a manual operation, in which a user or operator determines the target area 916 with reference to the presented image 912. As an alternative, the determination as to whether the intended underwater structure is included in the scene can be performed through automated processes, such as through the execution of image recognition software included in or provided separately from the system application 532. The user interface can include visual and audible indicators and guides as the object approaches the target area 916, such as directional arrows, approach velocity, warning indicators, range, heading, error or deviation, depth, temperature, or any other data or directional guidance. These projected targets 920 or other indicia can be produced by the inspection system 160 autonomously, to alert the operator of the presence of a foreign object or other anomaly detected in the 3D point cloud data collected by the lidar system 400.

The inspection system 160 can also monitor the location and orientation of a fuel assembly 124 or other object as it is being brought towards and placed at a target location. This monitoring can be facilitated through the placement of reference targets on the fuel assembly 124 or other object. In still further embodiments the object can be a refuel bridge 152, mast 148, an ROV or AUV including remote controlled or autonomous crawlers. The positioning information collected by the inspection system 160 can be fed back to an operator of inspection system 160, ROV, refuel bridge, mast, or to the automated control system of an AUV or other autonomous controlled equipment. The improved position and heading information provided by the inspection system 160 can increase the accuracy and decrease the risk of close-up operation to expensive equipment.

Figure 10:
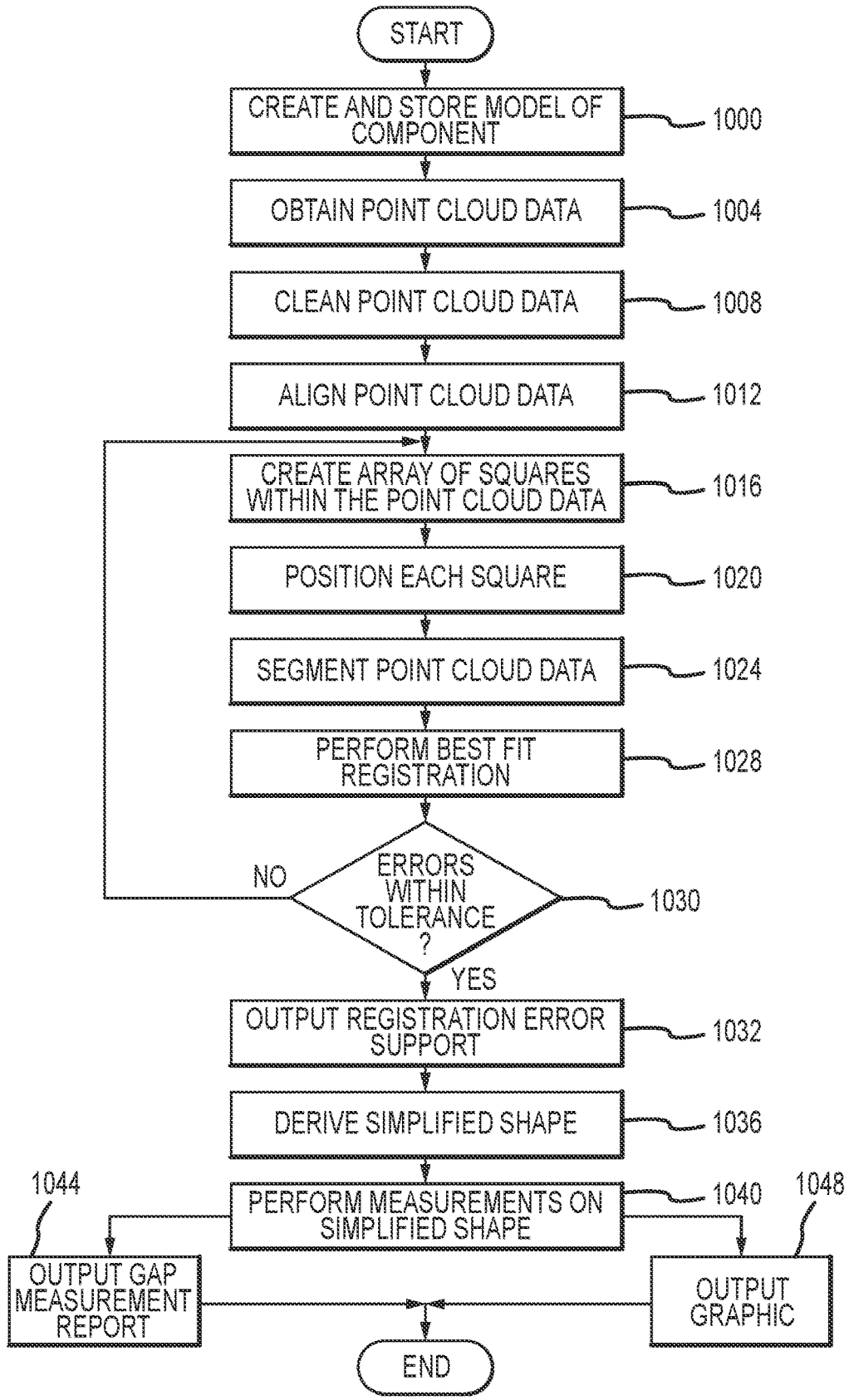
FIG. 10 is flowchart depicting aspects of a process for inspecting and measuring components of a nuclear reactor in accordance with embodiments of the present disclosure.

FIG. 10 is flowchart depicting aspects of process for inspecting and measuring components of a nuclear reactor in accordance with embodiments of the present disclosure.

Initially, a three-dimensional model of a component included in a set of components with respect to which measurements are to be made is created and stored (step 1000). The model can be in the form of a graphical or mathematical model derived from an actual instance of the component or from a design specification of the component. Next, a set of point cloud data is obtained from a volume containing a plurality of the components (step 1004). For example, where the modeled component is a fuel assembly 124 of a nuclear reactor, a set of point cloud data can be obtained from inside a reactor vessel 108 containing some number of fuel assemblies 124 by placing the optical housing 308 of an inspection system 160 within the reactor vessel, and moving the optical head 308 and an orientation of the optical head 308 to obtain desired fields of view. An initial scan of the volume can be at a relatively low resolution, to identify a particular area or areas of interest within the scanned volume, a high-resolution scan (relative to initial the low resolution scan) can then be performed in the identified area of interest. The high resolution scan can include modifications to the polarization of the transmitted light to improve resolution. The obtained point cloud data is then cleaned (step 1008) and aligned with the site coordinate frame (step 1012).

To perform gap measurements between the components, an array of squares within the point cloud is created, based upon the site geometry (step 1016). An instance of the 3D model is then positioned within each square (1020). This can include positioning a characteristic feature of the component included in the model according to the obtained point cloud data. For example, where the component is a nuclear reactor fuel assembly 124, the characteristic feature can be a top nozzle. At step 1024, the point cloud is segmented using the squares. A best fit registration of each solid model to each point cloud within each square is performed (step 1028). The best fit registration for an instance of the component can include determining a position and orientation of the model relative to a reference point and reference planes. At step 1030, a determination can be made as to whether registration errors are within tolerance. If registration errors are within tolerance, a report of those registration errors can then be output (step 1032). As an example, registration errors can include anomalies between the point cloud data obtained from a scan of a component in an installed location to the 3D model applicable to the component. If the registration errors are outside of tolerance then an error is produced and the system returns to step 1016. After the best fit registration, a simplified shape is derived from the 3D model (step 1036). This simplified shape can be derived from the model aligned to the point cloud, or a simplified geometry included in the original 3D model (such as a box or a 2D shape such as a square) can be applied as a representation of the 3D model and scanned component. Measurements on the simplified shape can then be performed (step 1040). These measurements can include, as examples, measurements of the center point, orientation, and distance to neighboring or adjacent objects at multiple points. For gap measurements this would include measuring the distance between the fuel assembly objects to obtain the gaps between all fuel assemblies. A report of the measurements can then be output (step 1044). In addition, a graphic of the measurements can be output (step 1048).

Embodiments of the present disclosure include an attitude sensor 407 integrated into the optical head to compensate for motion of the optical head, especially while mounted on a pole. Gap measurements can be performed using the solid models registered with the point cloud first and then making measurements from the solid models or simplified geometry of the solid models. The placement location of a fuel assembly or that the mast, core barrel, or fuel assembly is in the correct location prior to lowering can be validated. "Gaps" can be validated by scanning the core and comparing this to a scan, 3D model, or as-built model of the upper internals and virtually assembling them to identify any misalignments. The laser can be used as a pointer to identify where to place an object. Alternatively or in addition, the laser can be used as a pointer to identify where to find a foreign object for retrieval. Fuel assembly inspections can be performed by scanning few horizontal lines across the length of the fuel assembly to detect bow, bend, and twist. A long range NDE inspection can be performed, where a wide area inspection is performed first to identify areas of interest and then a high-resolution scan is performed on the areas of interest and also polarization can be modified to enhance resolution for the high resolution inspection. Multiple optical heads can be used to scan different areas at the same time to reduce total data collection time. Range-resolved water temperature measurements can be taken all the way to the core and used to help reconstruct the 3D data. An optical head 308 in accordance with at least some embodiments of the present disclosure can be configured so that it fits through the core plate (7 cm diameter). The optical head 308 can combine hemispherical scans with a spinning mirror, and the optical head can rotate using a pan unit that is located above the core plate.

The foregoing discussion has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for inspecting components within a nuclear facility, comprising:
    providing a lidar system, the lidar system including:
        a topside enclosure;
        an intermediate assembly; and
        a watertight optical head, wherein the optical head is connected to an end of the intermediate assembly, wherein the optical head is operatively connected to the topside enclosure by a tether included as part of the intermediate assembly, and wherein the optical head includes transmit and receive optics that are operable to transmit light generated by a laser light source, and are further operable to receive a return signal and to pass the return signal to a receiver;
    deploying the lidar system from an operator bridge or other structure adjacent at least one of a reactor pool or a storage pool, wherein deploying the lidar system includes:
        placing the optical head within the at least one of the reactor pool or the storage pool;
        connecting the intermediate assembly to the operator bridge or other structure;
        manipulating at least one of the intermediate assembly or the optical head such that a field of view of the optical head encompasses a desired portion of the at least one of the reactor pool or the storage pool;
    operating the lidar system to obtain point cloud data from within the field of view of the optical head, wherein the point cloud data includes a three-dimensional image of the desired portion of the at least one of the reactor pool or the storage pool, and wherein operating the lidar system includes scanning or imaging the desired portion of the at least one of the reactor pool or the storage pool to obtain the point cloud data;
    taking measurements or inspections of features of the components within the desired portion of the at least one of the reactor pool or the storage pool from the point cloud data; and
    determining locations of the components within the at least one of the reactor pool or the storage pool relative to a least a first reference point from the point cloud data.

2. The method of claim 1, further comprising:
    measuring a distance between a first one of the components and a second one of the components from the point cloud data.

3. The method of claim 1, further comprising:
    registering solid models of the components to the point cloud data; and
    measuring distances between the features of a first one of the registered solid models registered to a first one of the components and the features of a second one of the registered solid models registered to a second one of the components.

4. The method of claim 3, wherein at least one of the components is a fuel assembly top nozzle.

5. The method of claim 1, further comprising:
    obtaining location and identification information of a plurality of fuel assemblies located within a reactor vessel in the at least one of the reactor pool or the storage pool.

6. The method of claim 1, further comprising:
    operating the lidar system to identify at least one of a first reference point or a second reference point;
    operating the lidar system to identify an installation location of one of the components, wherein the installation location is identified relative to a location of the at least one of the first reference point or the second reference point; and
    using laser light output from the optical head to precisely point to the identified installation location of the component.

7. The method of claim 1, further comprising:
    operating the lidar system to identify a foreign object; and
    using laser light output from the optical head to precisely point to the foreign object for retrieval.

8. The method of claim 1, further comprising:
    scanning multiple lines at intervals along a fuel assembly to detect bow, bend, or twist.

9. The method of claim 1, wherein the point cloud data is obtained using multiple optical heads.

10. The method of claim 1, further comprising:
    taking range-resolved water temperature measurements and combining the water temperature measurements with the point cloud data.

11. The method of claim 1, further comprising:
    inserting the optical head through a hole in a core plate.

12. The method of claim 1, further comprising:
applying the point cloud data to validate a placement location of a component one of the components before lowering the component.

13. The method of claim 12, wherein the component is a fuel assembly, a core barrel, or a mast.

14. The method of claim 1, further comprising: comparing the point cloud data to a model of an area encompassing the data.

15. The method of claim 1, further comprising:
virtually assembling at least one of a model, a scan, or a representation of mating components in the reactor to validate assembly and identify any misalignments.

16. The method of claim 1, further comprising:
registering solid models of the components to the point cloud data; and
measuring distances between at least first and second sections of a simplified geometry formed from a first one of the solid models registered to a first one of the components and at least first and second sections of a simplified geometry formed from a second one of the solid models registered to a second one of the components.

17. The method of claim 1, wherein the optical head includes an upper optical head housing and a lower optical head housing.

18. The method of claim 17, wherein the lower optical head housing contains at least one of a scanning device or the laser light source.

19. A method for inspecting components and structures within a nuclear facility, comprising:
providing a lidar system, the lidar system including:
a topside enclosure;
an intermediate assembly; and
a watertight optical head, wherein the optical head is connected to an end of the intermediate assembly, wherein the optical head is operatively connected to the topside enclosure by a tether included as part of the intermediate assembly, and wherein the optical head includes transmit and receive optics that are operable to transmit light generated by a laser light source, and are further operable to receive a return signal and to pass the return signal to a receiver;
deploying the lidar system from an operator bridge or other structure adjacent at least one of a reactor pool or a storage pool, wherein deploying the lidar system includes:
placing the optical head within the at least one of the reactor pool or the storage pool;
connecting the intermediate assembly to the operator bridge or other structure;
manipulating at least one of the intermediate assembly or the optical head such that a field of view of the optical head encompasses a desired portion of the at least one of the reactor pool or the storage pool;
operating the lidar system to obtain point cloud data from within the field of view of the optical head, wherein the point cloud data includes a three-dimensional image of the desired portion of the at least one of the reactor pool or the storage pool, and wherein operating the lidar system includes scanning or imaging the desired portion of the at least one of the reactor pool or the storage pool to obtain the point cloud data;
taking measurements or inspections of features of the components within the desired portion of the at least one of the reactor pool or the storage pool from the point cloud data;
taking range-resolved water temperature measurements and combining the water temperature measurements with the point cloud data; and
applying the range-resolved water temperature measurements to modify the point cloud data using range-resolved index of refraction adjustments.

20. The method of claim 19, further comprising:
determining locations of the components within the at least one of the reactor pool or the storage pool relative to at least a first reference point from the point cloud data.

21. A method for inspecting components within a nuclear facility, comprising:
providing a lidar system, the lidar system including:
a topside enclosure;
an intermediate assembly; and
a watertight optical head, wherein the optical head is connected to an end of the intermediate assembly, wherein the optical head is operatively connected to the topside enclosure by a tether included as part of the intermediate assembly, and wherein the optical head includes transmit and receive optics that are operable to transmit light generated by a laser light source, and are further operable to receive a return signal and to pass the return signal to a receiver;
deploying the lidar system from an operator bridge or other structure adjacent at least one of a reactor pool or a storage pool, wherein deploying the lidar system includes:
placing the optical head within the at least one of the reactor pool or the storage pool;
connecting the intermediate assembly to the operator bridge or other structure;
manipulating at least one of the intermediate assembly or the optical head such that a field of view of the optical head encompasses a desired portion of the at least one of the reactor pool or the storage pool;
operating the lidar system to obtain point cloud data from within the field of view of the optical head, wherein the point cloud data includes a three-dimensional image of the desired portion of the at least one of the reactor pool or the storage pool, and wherein operating the lidar system includes scanning or imaging the desired portion of the at least one of the reactor pool or the storage pool to obtain the point cloud data;
taking measurements or inspections of features of the components within the desired portion of the at least one of the reactor pool or the storage pool from the point cloud data; and
moving an object toward a desired installation location within the at least one of the reactor pool or the storage pool; and
while moving the object toward the desired installation location, taking multiple three dimensional scans encompassing the object and a reference point, and calculating a location and orientation of the object relative to the reference point for each of the multiple three dimensional scans.

22. The method of claim 21, further comprising:
placing the object at the desired installation location; and
outputting at least one of a final position, orientation, and touchdown speed of the object.

23. The method of claim 21, further comprising:
taking range-resolved water temperature measurements and combining the water temperature measurements with the point cloud data; and
using the range-resolved water temperature measurements to modify the point cloud data using range-resolved index of refraction adjustments.

24. The method of claim 21, further comprising:
determining locations of the components within the at least one of the reactor pool or the storage pool and relative to at least a first reference point from the point cloud data.

* * * * *